(12) United States Patent
Ahlstrom

(10) Patent No.: US 11,718,386 B2
(45) Date of Patent: Aug. 8, 2023

(54) CUPOLA FAIRING FOR AN AIRCRAFT AND METHOD FOR FABRICATING THE SAME

(71) Applicant: AERO DESIGN LABS LLC, Fort Worth, TX (US)

(72) Inventor: Eric A. Ahlstrom, South Willard, UT (US)

(73) Assignee: Aero Design Labs LLC, Fort Worth, TX (US)

( * ) Notice: Subject to any disclaimer, the term of this patent is extended or adjusted under 35 U.S.C. 154(b) by 145 days.

(21) Appl. No.: 16/648,113

(22) PCT Filed: Sep. 20, 2018

(86) PCT No.: PCT/US2018/051997
§ 371 (c)(1),
(2) Date: Mar. 17, 2020

(87) PCT Pub. No.: WO2019/060575
PCT Pub. Date: Mar. 28, 2019

(65) Prior Publication Data
US 2020/0255118 A1    Aug. 13, 2020

Related U.S. Application Data

(60) Provisional application No. 62/560,982, filed on Sep. 20, 2017.

(51) Int. Cl.
*B64C 7/00*     (2006.01)
*B64F 5/10*     (2017.01)
*B64C 1/00*     (2006.01)

(52) U.S. Cl.
CPC .............. *B64C 7/00* (2013.01); *B64C 1/0009* (2013.01); *B64F 5/10* (2017.01); *B64C 2001/0045* (2013.01)

(58) Field of Classification Search
CPC ...... B64C 1/36; B64C 2001/0045; B64C 7/00; H01Q 1/28; H01Q 1/282
See application file for complete search history.

(56) References Cited

U.S. PATENT DOCUMENTS

| 36,896 A | 11/1862 | Currier |
|---|---|---|
| 2,350,777 A | 9/1940 | Lanciani |

(Continued)

OTHER PUBLICATIONS

International Search Report and Written Opinion for PCT/US2018/051997, dated Feb. 6, 2019.

(Continued)

*Primary Examiner* — Joshua J Michener
*Assistant Examiner* — Michael B. Kreiner

(57) ABSTRACT

A cupola fairing (250) for reducing drag and increasing lift on an aircraft fuselage (210) and wings (220). The fairing includes a housing length extending along a longitudinal axis, and a variable width extending normal to the longitudinal axis. The housing width is variable and defined by a plurality of cross-sectional areas of the cupola fairing. The fairing has a substantially smooth exterior surface that is curved along the length and the variable width of the housing. The housing surface has its longitudinal and transverse curvatures being defined by metrics corresponding to a reference wing root chord of the aircraft (200), a cross-sectional area of the fuselage, a percentage of the cross-sectional area to be covered by the fairing, and positioning of the cupola fairing on the crown portion of the fuselage (210). The housing has a lower surface configured to conform to a shape of the crown at which the cupola fairing (250) is positioned.

20 Claims, 18 Drawing Sheets

(56) References Cited

U.S. PATENT DOCUMENTS

| | | | |
|---|---|---|---|
| 4,314,681 A | 2/1982 | Kutney | |
| 4,318,328 A * | 3/1982 | Rona | B64D 7/08 |
| | | | 244/130 |
| 5,115,999 A * | 5/1992 | Buchsel | B64C 1/00 |
| | | | 244/119 |
| 5,845,879 A | 12/1998 | Jensen | |
| 5,992,797 A * | 11/1999 | Seidel | B64C 1/00 |
| | | | 244/119 |
| 6,098,922 A | 8/2000 | Hahl | |
| 6,149,101 A | 11/2000 | Tracy | |
| 7,967,252 B2 * | 6/2011 | Ferguson | B64C 7/00 |
| | | | 244/121 |
| 7,967,253 B2 * | 6/2011 | Ferguson | H01Q 1/28 |
| | | | 244/121 |
| 8,172,181 B2 * | 5/2012 | Burgess | B64C 1/0009 |
| | | | 244/119 |
| 9,669,927 B2 * | 6/2017 | Hodge | B64D 9/00 |
| 9,708,065 B2 * | 7/2017 | Sankrithi | B64C 1/00 |
| 10,059,426 B2 * | 8/2018 | Flores | B64C 1/36 |
| 10,131,445 B2 * | 11/2018 | Ferguson | B64D 45/00 |
| 10,425,150 B1 * | 9/2019 | Earnhardt, Jr. | H04B 7/18508 |
| 10,637,135 B2 * | 4/2020 | Sclafani | H01Q 1/421 |
| 10,727,574 B2 * | 7/2020 | Lewis | H01Q 1/42 |
| 2008/0149767 A1 | 6/2008 | Burgess | |
| 2009/0242702 A1 | 10/2009 | Cain et al. | |
| 2009/0321572 A1 | 12/2009 | Ferguson | |

OTHER PUBLICATIONS

"World War II Fighter Aerodynamics" by David Lednicer, EAA 135815—Sport Aviation, Jan. 1999.

Hoerner, Sighard F., "Fluid Dynamic Drag: Practical Information on Aerodynamic Drag and Hydrodynamic Resistance", 2nd Edition, Hoerner Fluid Dynamics (Jun. 25, 1993), ISBN-13: 978-9993623939.

Hoerner, Sighard F., "Fluid Dynamic Lift: Practical Information on Aerodynamic and Hydrodynamic Lift", 2nd Edition, Hoerner Fluid Dynamics (Jun. 1992), ISBN-13 978-9998831636.

Raymer, Daniel P., "Aircraft Design: A Conceptual Approach", 2nd Edition (1992), ISBN-930403-51-7 pp. 48-49.

Office Action as received in European application 18 808 550.0 dated Mar. 2, 2022.

* cited by examiner

CUPOLA FAIRING FOR AN AIRCRAFT AND METHOD FOR FABRICATING THE SAME

CROSS-REFERENCE TO RELATED APPLICATIONS

This application claims the benefit under 35 U.S.C. § 371 to international application No. PCT/US2018/051997, filed on Sep. 20, 2018, which claims priority to U.S. Provisional Application No. 62/560,982, filed on Sep. 20, 2017, the contents of which are incorporated by reference herein in their entireties.

FIELD OF INVENTION

The invention relates to aircraft fairings, and more specifically to a cupola fairing on an aircraft.

BACKGROUND OF INVENTION

The majority of practical and successful personal, commercial, and military transport aircraft consist of designs incorporating wing aspect ratios greater than 5:1 and fuselage fineness ratios greater than 6:1. All of these successful transport aircraft are of what is considered by the industry as a conventional configuration, with a roughly tubular fuselage, a single high aspect ratio lifting wing located near the aircraft center of gravity, and a negative lifting horizontal tail. These designs consist of high wing configurations for military transports and some smaller commercial transports, while some smaller and the majority of large commercial transports are of low wing configuration.

Presently, the design of the wing, fuselage and horizontal stabilizer of an aircraft has typically been segregated. Each component has been designed in isolation and then integrated with the complete aircraft after the respective designs has been completed. Global correction factors are used in the design of the wing to account for assumed induced wing root velocity at the fuselage intersection.

The impact of integrating a wing designed in isolation with a round fuselage leads to a significant reduction in the spanwise lift distribution across the width of the fuselage. Research has been continuously ongoing in the aircraft industry to design wings, and specifically the wing root area, to improve lift on the fuselage and spanwise lift distribution.

Aligning the spanwise lift distribution closer to elliptical reduces induced drag. This was established by Ludwig Prandtl. Any modification to an existing airframe that yields a more elliptical spanwise lift distribution increases the Oswald span efficiency ratio, which has a maximum of 1.0.

Prior Art Cupola Designs

In some WWII era fighter aircraft, bubble canopies were used to give the pilot better visibility. These accidentally yielded somewhat better spanwise lift distributions, as illustrated by the P-51B vs. P-51D in an article entitled "World War II Fighter Aerodynamics" by Lednicer, 01/1999. This effect was not explored by the industry, as the bubble canopies of the era exhibited separation on the aft area. Later model jet fighters also used bubble canopies, which were located well forward of the wing and without regard for spanwise lift effects.

A later commercial jet aircraft, i.e., a BOEING 767-200 aircraft, was converted by the military to include a cupola fairing 100 in what was to become known as a 767 Airborne Optical Adjunct (AOA) aircraft 10, as illustratively shown in FIG. 1. The cupola fairing 50 was mounted on the crown 20 of the fuselage 12 over the cockpit 14 at the bow and extended rearward past the wings 18 towards the horizontal and vertical stabilizers, and strakes (if present) 16 at the stern, and covered more than half of the entire crown portion of the fuselage 12. The BOEING 767 AOA aircraft 10 was used from the 1980's into the early 2000' to collect infrared data. The cupola fairing 50 was sized and configured to house electronics and antenna arrays used to carry out the infrared data detection/collection and other functions, and without regard for the spanwise lift effects.

Wingtip Devices

The impact and wide use of wingtip devices must also be considered. Classically, induced drag is defined as CL2e/πAR where: CL is defined as the global lift coefficient of the reference wing area; "AR" or aspect ratio is the span squared divided by the reference wing area; it is a constant; and "e" is the span efficiency factor.

Per Prandtl, the minimum induced drag is achieved when the spanwise distribution of lift is elliptical. The theoretical limit of the span efficiency factor is 1.0. Vertical deviations in span due to wingtip devices are considered to be increases in span. Thus, the vertical displacement of winglets, curved winglets, split winglets, and the established tip vortex effects of all wingtips impact the span efficiency factor. (See, e.g., Hoerner, Sighard F., "Fluid Dynamic Drag: Practical Information on Aerodynamic Drag and Hydrodynamic Resistance", Second Edition, Hoerner Fluid Dynamics (Jun. 25, 1993), ISBN-13: 978-9993623939; and Hoemer, Sighard F., "Fluid Dynamic Lift: Practical Information on Aerodynamic and Hydrodynamic Lift", 2nd Edition, Hoerner Fluid Dynamics (June 1992), ISBN-13 978-9998831636).

The impact of most winglet devices is to increase lift at the wingtips, which moves the lift outboard, away from the elliptical optimum. This effect decreases the span efficiency factor. The extra lift at the tips increases the outboard bending moment of the wing, thereby requiring significant additional structural weight to be added to provide for the bending moment. This increases the empty weight of the aircraft, which offsets much of the fuel savings resulting in roughly equivalent range at lower fuel burn. Aircraft whose wings were designed overly robust without winglets have less structural weight impact from the installation of winglets and have demonstrated an increase in range. The lift and drag bookkeeping and relative impacts of all of these individual effects are subjects of debate within the aeronautical design community.

There are also positive effects of winglets that are widely known in the industry, while other effects are debated. Primarily, a correctly designed winglet moves the multiple wingtip vortices outboard, aft, and displaced vertically from a conventional wingtip. This reduces the impact the tip vortices have on aft rotation of the normal force vector of the wing. The vertical component of the vector is lift, while the aft component is drag. Reduction of the aft component of the wing normal force vector constitutes the majority of the positive benefit of winglets to overall lift-to-drag (L/D) ratio. The second benefit is increased lift to a design that is limited by span due to infrastructure such as airport gate spacing.

A wingtip device that goes in the opposite direction is the Boeing raked wingtip. While a superior design for span efficiency and with fewer detrimental impacts, implementing a raked wingtip with increased wing span impacts infrastructure. Boeing has addressed this with a wingtip folding mechanism for the 777X.

Wing to Fuselage Interference

Research has shown additional negative effects of wing interface with the fuselage of typical transport designs widely known by the industry. These all negatively impact the L/D ratio, and therefore aircraft efficiency. These effects include, but are not limited to: stagnation at the wing leading edge to fuselage intersection; forward chord vortex exchange of flow from the wing to the fuselage and mid chord vortex exchange of flow from the fuselage to the wing. These cause rotation in the flow along the wing root not parallel to the flight axis; and wing trailing edge to fuselage separation driven by the mid chord vortex flow.

The wing "reference area" is commonly defined as the wing area including the fuselage and the wingtips defined by the leading and trailing edges of the physical wing. (See, e.g., Raymer, Daniel P. "Aircraft Design: A Conceptual Approach", $2^{nd}$ Ed. (1992), ISBN-930403-51-7 pages 48-49).

There is significant prior art in supersonic and transonic aircraft to create an "area ruling" effect at the wing to fuselage intersection. This practice sometimes increases the cross-sectional area of an airframe ahead and behind the wing intersection. In other applications, area ruling is used to decrease the cross-sectional area of the fuselage at the wing intersection.

In view of the aforementioned and other deficiencies in the prior art, an object of the present invention is to provide a method and apparatus that can be added to existing and new aircraft designs to improve fuselage lift and reduce wing to fuselage interface drag with a net result of an increase in L/D ratio of existing and new aircraft.

SUMMARY OF THE INVENTION

The above disadvantages are avoided and/or solved by various embodiments of a cupola fairing for mounting on a crown portion of an aircraft fairing based on metrics corresponding to a reference wing root chord of the aircraft, a cross-sectional area of the fuselage, a percentage of the cross-sectional area of the crown portion to be covered by the cupola fairing, and positioning of the cupola fairing on the crown portion of the fuselage, and method for determining the same. The configuration of the cupola fairing of the present invention along with its positioning on the crown portion of the aircraft between the forward wings has provided unexpected benefits including a significant increase in lift over the wingspan and fuselage, a reduction in drag at the wing root of the aircraft wing, and other benefits as discussed below in further detail.

In one embodiment, a method of fabricating a cupola fairing for increasing lift and decreasing drag along the wing root and fuselage of an aircraft comprises the steps of: determining a reference wing root chord of a wing of the aircraft; determining a cross-sectional area of the aircraft fuselage to be used; determining a percentage of the fuselage cross-sectional area to be used; determining a positioning of the cupola fairing on the crown portion of the fuselage; determining a longitudinal profile of the cupola fairing; optimizing metrics associated with the cross-sectional area, positioning and longitudinal profile of the cupola fairing with respect to the reference wing root chord; and fabricating the cupola fairing with a smooth, curved exterior surface as defined by the determining steps to help air flow straighter along the wing at the wing root and prevent the air flow from wrapping around the fuselage.

In one aspect, the cupola fairing tapers forward and aft of its maximum cross-sectional area in a smooth fashion. In another aspect the profile of the cupola fairing is formed by a gradient optimization program to smooth the curve along the longitudinal axis of the cupola fairing. In yet another aspect, the cross-sectional area of the cupola fairing is one of circular, elliptical or other curved shapes.

In one aspect, the cross-sectional area of the aircraft fuselage to be used comprises locating a fuselage cross-sectional area where a centerline of the fuselage and a leading edge of the wing intersect. In another aspect, the percentage of the fuselage cross-sectional area to be used is in a range of 5% and 25% of the fuselage cross-sectional area where a centerline of the fuselage and a leading edge of the wing intersect. In yet another aspect, the positioning of the cupola fairing on the crown portion of the fuselage is determined by positioning a maximum cross-sectional area of the cupola fairing at a fuselage position that is between −50% and 25% of the reference wing root chord at the aircraft centerline.

In one aspect, the optimizing step further comprises the step of modifying trailing edge portions of each wing to reduce drag caused by the cupola fairing. In another aspect, the modifying the trailing edge portions of each wing includes repositioning components forming the trailing edges of each wing. In yet another aspect, the modifying the trailing edge portions of each wing includes replacing components forming the trailing edges of each wing. In still another aspect, the modifying the trailing edge portions of each wing includes replacing each wing with a replacement wing that has differently configured wing trailing edges portions.

In another embodiment, a cupola fairing for an aircraft comprises: a housing having a length extending along a longitudinal axis, and a cross-sectional area, the housing having an exterior surface that is curved along the cross-sectional area and curved along the length of the cupola fairing, the cross-sectional curve being defined by a plurality of curves spaced apart at predetermined distances based on a reference wing root chord of the aircraft and the curvature along the length of the cupola fairing being defined by a spline formed along the plurality of spaced-apart curves; and the housing having a lower surface configured to conform to a shape of a crown of an aircraft located at a predetermined position along the reference wing root chord of the aircraft.

In yet another embodiment, a cupola fairing for positioning on a crown portion of a fuselage of an aircraft comprises: a housing having a length extending along a longitudinal axis, and a variable width extending normal to the longitudinal axis, the width being variable and defined by a plurality of cross-sectional areas of the cupola fairing, the cupola fairing having a substantially smooth exterior surface that is curved along the length and the variable width of the housing; the exterior surface of the housing having its longitudinal and transverse curvatures being defined by metrics corresponding to a reference wing root chord of the aircraft, a cross-sectional area of the fuselage, a percentage of the cross-sectional area to be covered by the cupola fairing, and positioning of the cupola fairing on the crown portion of the fuselage; the housing having a lower surface configured to conform to a shape of the crown portion at which the cupola fairing is positioned.

In one aspect, the lower surface is configured so that the longitudinal axis is aligned with a centerline of the fuselage. In another aspect, the housing is symmetrical about the longitudinal axis. In yet another aspect, the housing is substantially elliptical in shape. In still another aspect, the housing is fabricated from at least one of a composite material and a metal. In another aspect, the exterior surface is convex-shaped. In yet another aspect, the housing includes a hollow interior portion. In still another aspect, the interior portion includes a plurality of spaced-apart support members configured to reinforce the housing.

Figure 1:
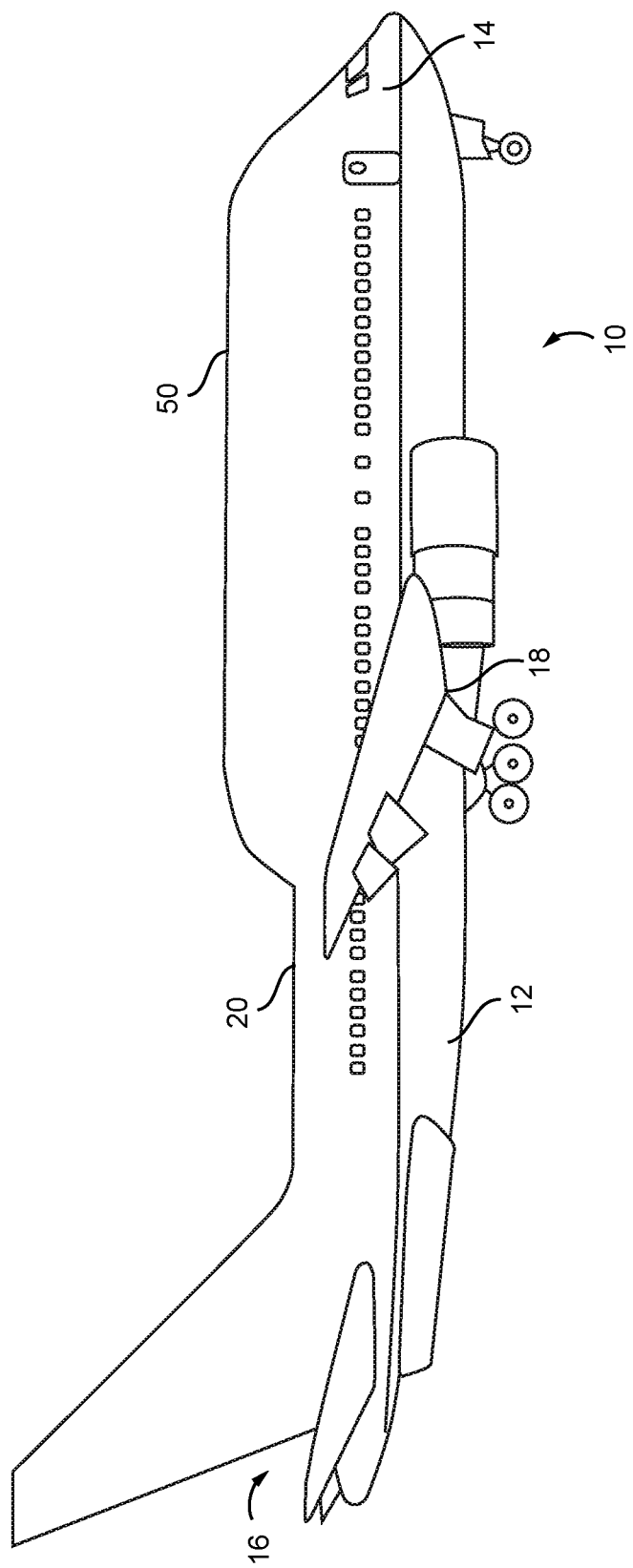
FIG. 1 is a top, left side perspective view of a prior art Boeing 767 AOA aircraft having a cupola mounted over the fuselage of the aircraft.
Figure 2:
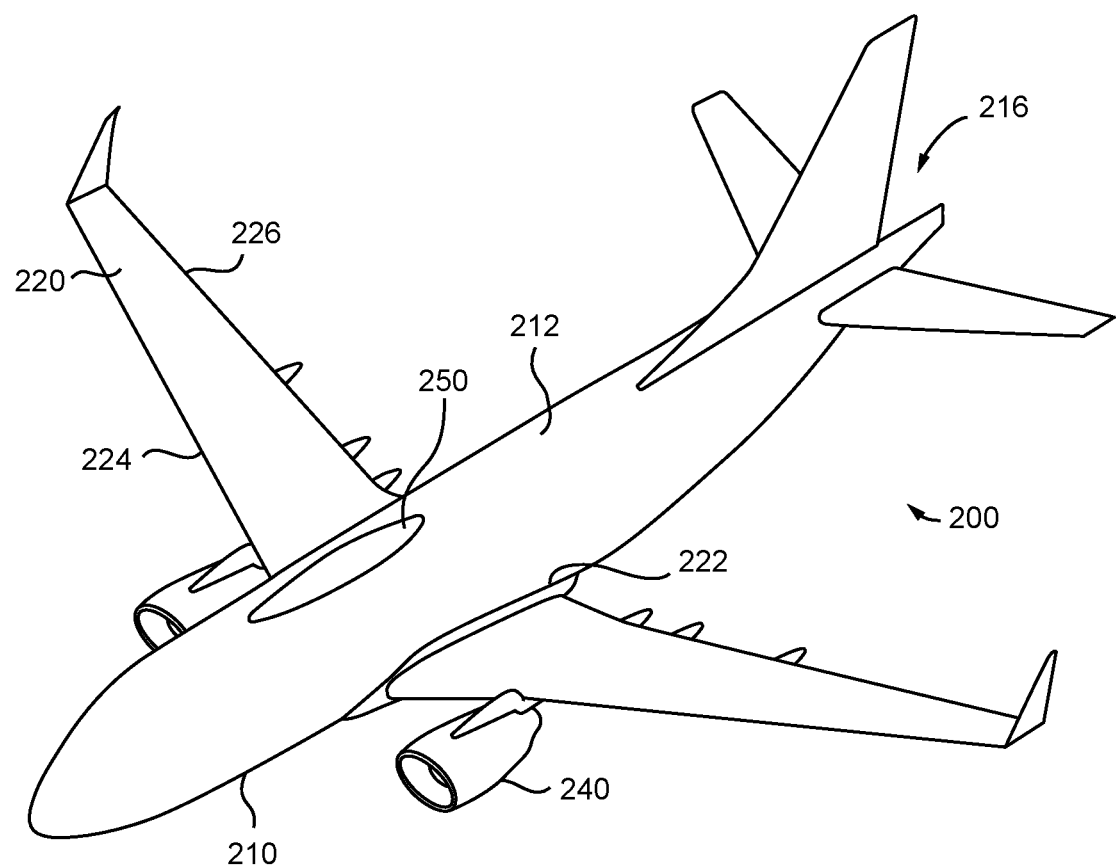
FIG. 2 is a top, front, left side perspective view of an aircraft including a first embodiment of cupola fairing of the present invention illustratively mounted on a crown portion of an aircraft fuselage and having a 7% fuselage cross-sectional area and located at 15% centerline wing root reference chord of the aircraft.
Figure 3:
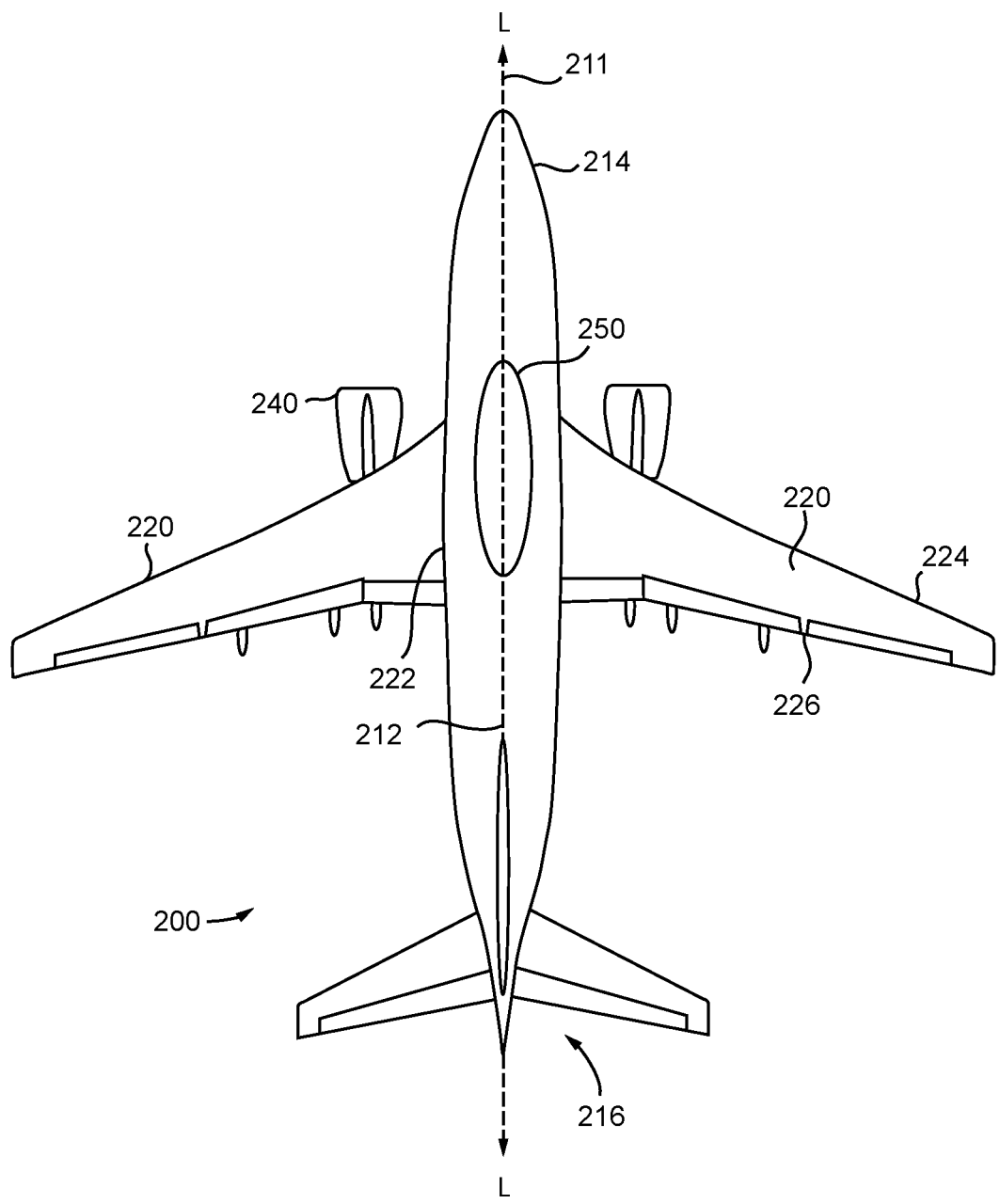
FIG. 3 is a top plan view of the aircraft of FIG. 2 illustrating the cupola of the present invention.
Figure 4:
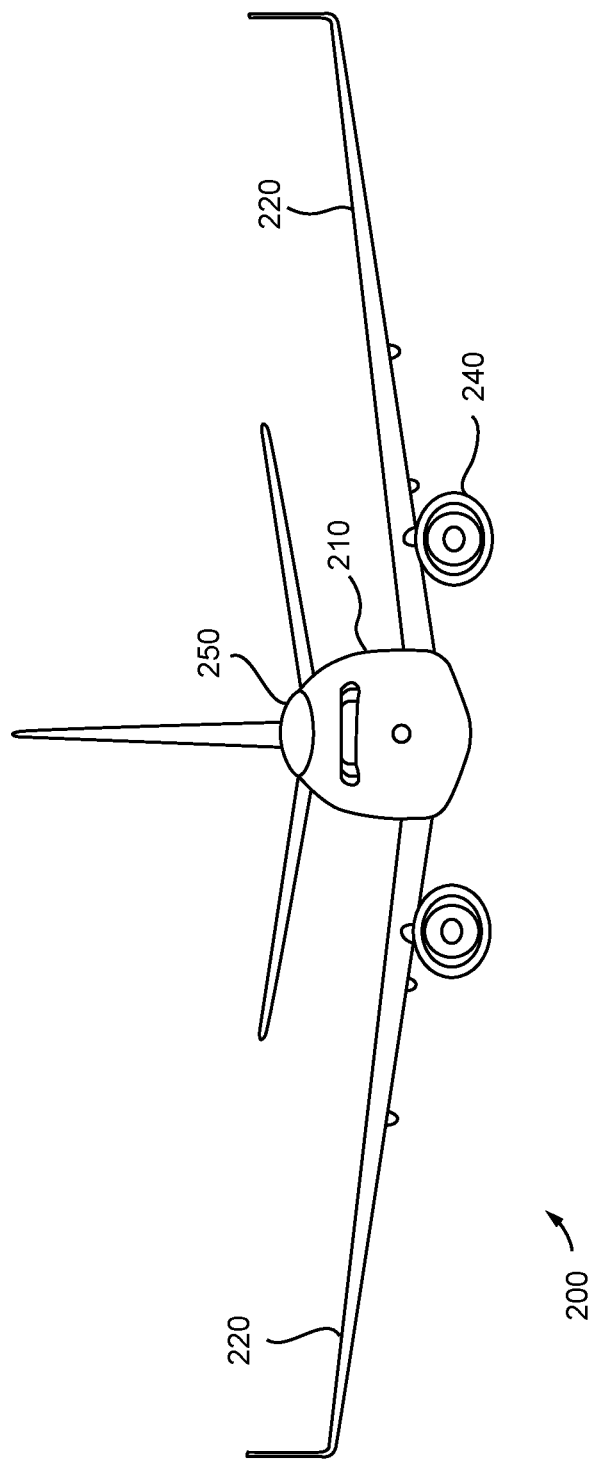
FIG. 4 is a front elevational view of the aircraft of FIG. 3 illustrating the cupola of the present invention.
Figure 5:
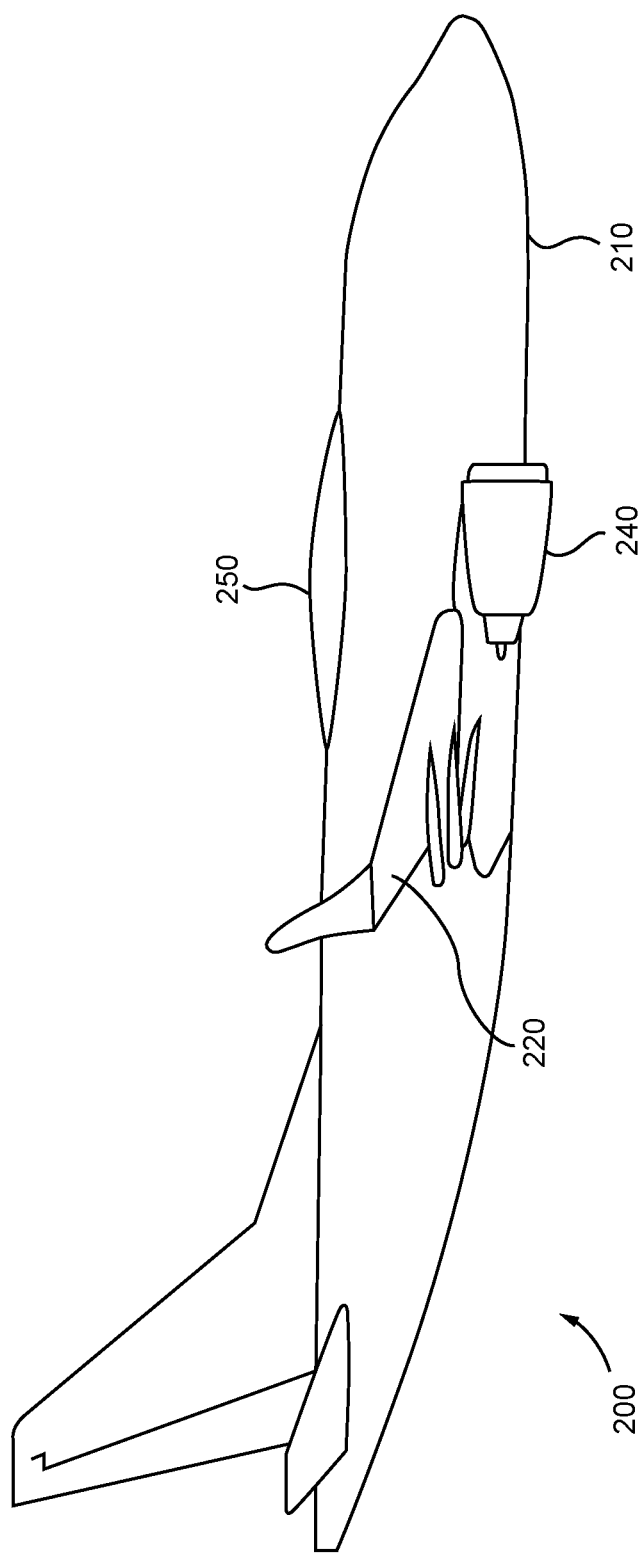
FIG. 5 is a right side elevational view of the aircraft of FIG. 2 illustrating the cupola of the present invention.

To further facilitate an understanding of the invention, the same reference numerals have been used, when appropriate, to designate the same or similar elements that are common to the figures. Further, unless otherwise indicated, the features shown in the figures are not drawn to scale, but are shown for illustrative purposes only.

DETAILED DESCRIPTION OF THE EMBODIMENTS

The present invention relates to a cupola fairing for positioning on a crown portion of an aircraft fuselage. The cupola fairing is sized and dimensioned to be mounted on the crown portion of the fuselage and extend longitudinally along the fuselage at a spanwise position proximately between the aircraft wings in order to optimize air flow around the fuselage so that the air flows straighter along the wing at the wing root. In particular, the cupola fairing helps reduce drag over various portion of the aircraft and thereby increases fuselage lift and spanwise (wing tip to wing tip) lift such that it is closer to an elliptical distribution. Other advantages include reducing wing leading edge stagnation drag and trailing edge separation drag, and reducing wing-to-fuselage and fuselage-to-wing rotational flow and associated drag.

In addition, a reduction in drag in other areas of the airframe can be realized. These improvements may be specific to aircraft configuration, for example, tail effects will be different on conventional versus T-tails. The cupola fairing can provide further advantages to reduce drag from transonic turning shocks on the forward fuselage of the aircraft, with reduction in wave and pressure drag. Additionally, turning of the flow on the forward and aft areas of the fuselage is reduced with attendant reduction of turning shocks, stagnation, and separation. Another advantage is a reduction in transonic turning shocks on the aft fuselage of the aircraft, thereby reducing wave and pressure drag on the fuselage. Further advantages can include a reduction in separation of the fuselage flow upstream, around, and aft of the horizontal stabilizer, and a reduction of stagnation of the horizontal stabilizer leading edge to fuselage intersection.

Referring to FIGS. 2-5, an aircraft 200 having a cupola fairing 250 mounted on the crown portion 212 of the aircraft fuselage 210 is illustratively shown. The aircraft 200 includes a tubular shaped fuselage 210, a cockpit at the forward end 214 and horizontal/vertical stabilizers at the aft end 216 of the fuselage 200. A forward wing 220 extends laterally from each of the port and starboard sides of the fuselage, each of which can include an engine 240 for lifting and propelling the aircraft through the air in a well-known manner. The port and starboard side wings are symmetrical in shape. The cupola fairing 250 is positioned on the top of the aircraft fuselage 210 and distributed symmetrically about the centerline "L" (FIG. 3) of the top portion of the fuselage 210 of the aircraft 200.

Determining the profile of the cupola fairing 250 helps to optimize air flow around the fuselage so that the air flows straighter along the wing 220 at the wing root 222. The cupola fairing 250 tapers forward and aft of its maximum cross-sectional area in a smooth fashion. A well-known, commercially available gradient optimization CAD program, which is common to wing design, can be used to smooth the curve along the longitudinal axis so as to reduce shock effects and adverse pressure gradients along the aircraft.

Figure 6:
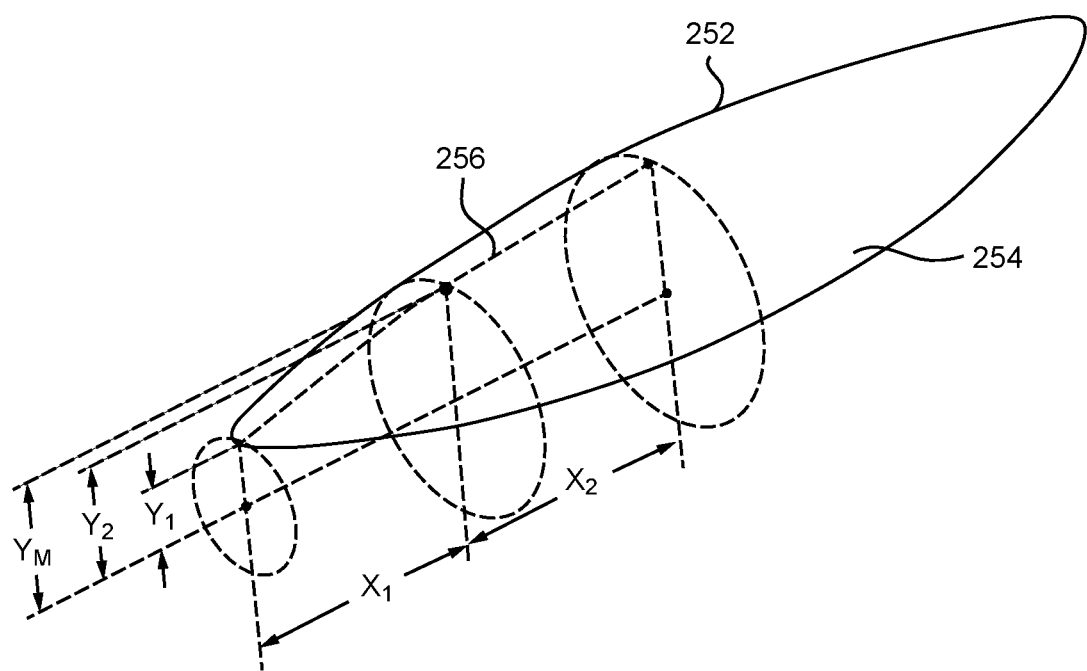
FIG. 6 is a schematic top, right side perspective view of a cupola fairing of the present invention and suitable for mounting on a crown portion of an aircraft fuselage.

Referring now to FIG. 6, a cupola fairing 250 having a twenty percent (20%) maximum cross-sectional area of the fuselage of an aircraft 10 (e.g., BOEING 737-700 aircraft) is illustratively shown. Although the cupola fairing 250 of the present invention is primarily discussed with reference to a BOEING 737 model aircraft, such aircraft model is not considered limiting, as the cupola fairing and its construction and fuselage positioning are applicable on other aircraft models from BOEING, AIRBUS and other commercial and military aircraft manufactures.

The cupola fairing includes a housing 252 having a length extending along a longitudinal axis, and a cross-sectional area. An exterior surface 254 of the housing 252 is curved along the cross-sectional area and curved along the length of the fairing 250, where the cross-sectional curve is defined by a plurality of curves which are spaced apart at predetermined distances based on a reference wing root chord of the aircraft 200 (see, e.g., FIG. 8). A person of ordinary skill in the art will appreciate that chord measurements are taken between the leading and trailing edges of the reference wing. The curvature along the length of the fairing 250 is defined by a spline 256 formed along the plurality of spaced-apart curves. For example, in FIG. 6, the spline 256 is illustratively formed by an upper line extending across top perimeter edges of the three circles spaced apart by distances $X_1$ and $X_2$, and having, respectively, radii $Y_1$, $Y_2$, and $Y_M$. A lower surface of the housing 252 is configured to conform to a shape of a crown of an aircraft 200 located at a predetermined position along the reference wing root chord of the aircraft 200.

The illustrative cupola fairing is defined by circular cross-sections and illustratively has a 6.7:1 length to height ratio. The dimensions at the maximum cross-sectional area of the fairing is used to locate the fairing with reference to the wing leading edge to fuselage intersection, and can illustratively represent a 15%, 25%, and 35% wing root reference chord at the fuselage centerline. The shape of the outer edge of the fairing is determined by the intersection of the fairing at the aircraft fuselage. The cupola fairing 250 includes a symmetrical cross-sectional area, and can have symmetrical or asymmetrical fore and aft portions with respect to the maximum cross-sectional area of the fairing. As shown in FIG. 6, the profile of the fairing is generated by 3D CAD software program (e.g., SolidWorks program by Dassault Systémes SolidWorks Corp. of Waltham, Mass., USA) with minimal governing dimensions. A person of ordinary skill in the art will appreciate that any commercially available computer aided design software can generate this fairing profile from these dimensions $X_1, X_2, Y_1, Y_2, Y_M$ with this level of definition.

Figure 7:
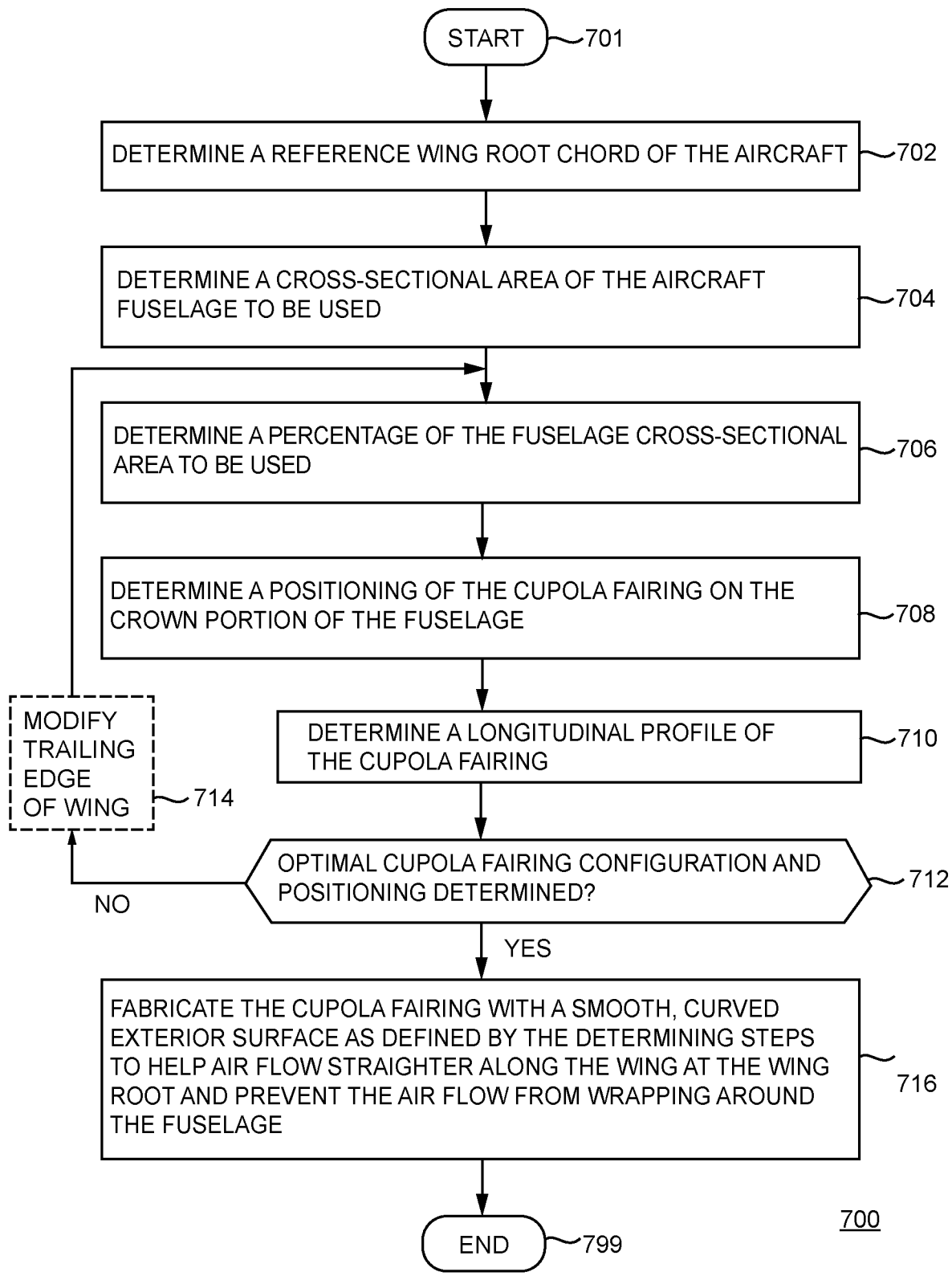
FIG. 7 is a flow diagram illustrating a method for determining the configuration and positioning of a cupola fairing on the crown portion of the aircraft fuselage between the wings.

Referring now to FIG. 7, a flow chart of a method 700 for forming and positioning the cupola fairing 250 on a crown portion 212 of the fuselage of an aircraft 200 is illustratively shown. The method 700 starts at step 701, where a model of an aircraft for which the fairing is to be mounted onto or otherwise incorporated with the fuselage 210 of the aircraft is determined. For purposes of better understanding the invention, a model of a BOEING 737 aircraft is illustratively used, but such model aircraft is not considered limiting. At step 702, a reference wing root chord of the aircraft 200 is determined.

Figure 8:
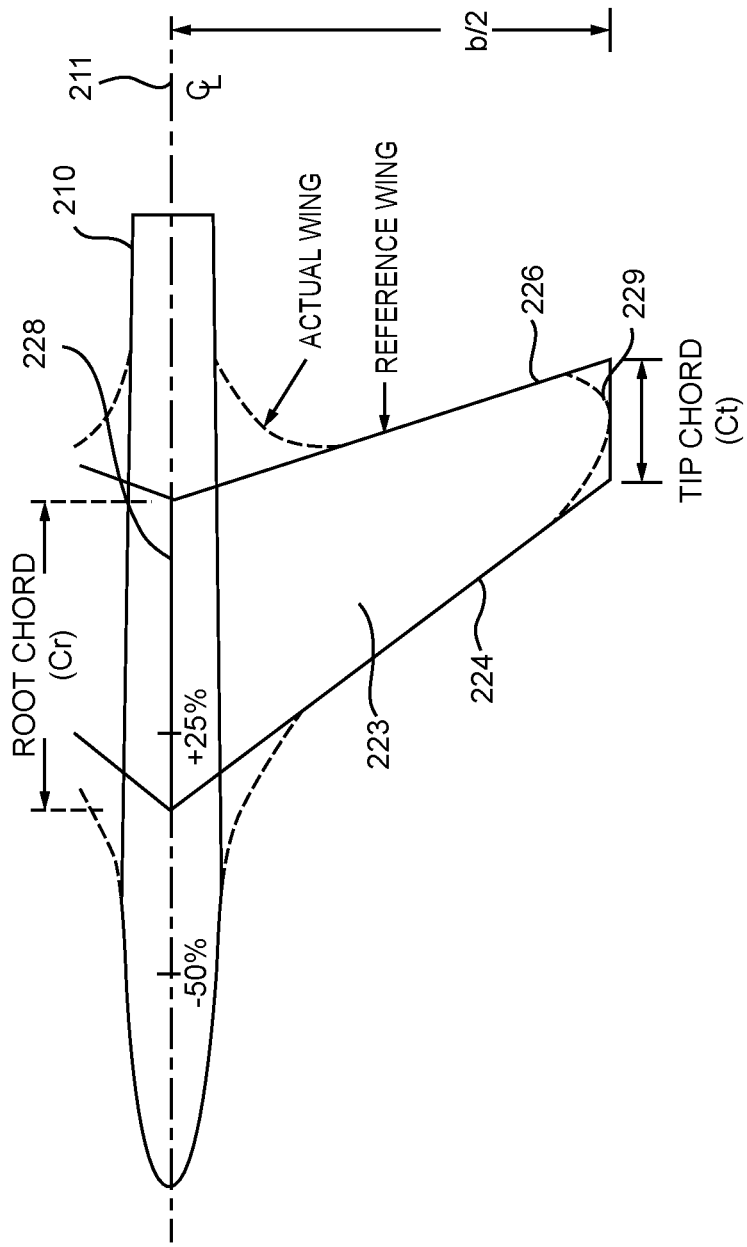
FIG. 8 is a schematic view of a prior art aircraft wing attached to the fuselage of an aircraft and depicting a reference wing area and wing geometry.

Referring to FIG. 8, a schematic diagram illustrating a well-known comparison between an actual aircraft wing along with its geometry for determining the corresponding reference wing 223 is shown. The reference wing 223 normally differs from the shape of the actual wing (AW) of an aircraft 200, as the reference wing 223 extends from the longitudinal centerline "L" of the aircraft 200 to the end of the wing at the tip chord (Ct) 229, as opposed to the where the actual wing joins with the exterior of the fuselage 210, as well as the end of the wing. The reference wing 223 is further bounded by a leading edge 224 and trailing edge 226 in a well-known manner and as shown in FIG. 8. The wing root chord (Cr) 228 is a distance or length that extends along the fuselage 210 where the leading and trailing edges 224, 226 intersect with the centerline 211 of the fuselage 210. Accordingly, the reference wing root chord 228 is the same when taken from the wing component on either port or starboard sides of the aircraft. Once the length of the wing root chord 228 is determined, the method 700 proceeds to step 704.

At step 704, the cross-sectional area of the aircraft fuselage to be used in the modeling is determined. The cross-sectional area is constant or can vary over the length of the fuselage 210. However, the dimensions located at the maximum cross-sectional area of the fairing 250 are used to locate the fairing with reference to the intersection where the wing leading edge 224 to fuselage 210 occurs, as discussed above with respect to FIG. 6. Accordingly, the location of the cross-sectional area of the aircraft fuselage to be used in step 704 is the fuselage cross-sectional area location where the leading edge 224 of the wing joins/intersects the centerline 211 of the fuselage 210.

At step 706, a percentage of the fuselage cross-sectional area to be used is determined. In particular, a determination of an optimal maximum width of the cupola fairing 250 is made, where the maximum cross-sectional area of the cupola fairing to the wing reference span is at least 5% of the fuselage cross-sectional area at that point and less than 25%. The cross-sectional area of the fairing can be configured as circular, elliptical or other curved shapes. The method 700 then proceeds to step 708.

Thereafter, at step 708, the positioning of the fairing on the crown portion of the fuselage is determined. A maximum cross-sectional area of the cupola fairing 250 is located in a range approximately at or between −50% and 25% of the reference wing root chord at the aircraft centerline as measured from the intersection where the leading edge 224 of the wing joins the centerline 211 of the fuselage 210, as illustratively shown in FIG. 8. A person of ordinary skill in the art will understand that the reference wing root chord is well-known nomenclature in the industry for defining wing geometry to identify the widest part of the fairing near the maximum combined cross-sectional area of the fuselage and wing, specifically ignoring "area ruling" prior art (e.g., a design practice to reduce drag on an aircraft at transonic and supersonic speeds), thereby making the cupola fairing of the present invention novel to the industry.

At step 710, a longitudinal profile of the cupola fairing 250 is determined. In particular, an optimum, maximum and minimum length of the cupola fairing 250 is determined by identifying the distortion in the air flow on the fuselage induced by the wing. Preferably, the total length of the cupola fairing 250 should be less than two-times (2×) the length of the reference root chord 228, although the total length of the fairing is not considered limiting, as the its optimum configuration can change significantly for aircraft which are designed to cruise at different Mach speeds (e.g., 0.72 Mach vs. 0.92 Mach). The cupola fairing configuration, i.e., volume, taper, and position are optimized by use of computational fluid dynamic (CFD) or wind tunnel analysis for simulating and observing the maximum lift to drag ratio. That is, a matrix of fairing cross-sectional area, longitudinal profile, and longitudinal position versus the reference wing root is simulated and tested using computational fluid dynamics and/or a wind tunnel analysis to determine the optimum design. An optimal cupola fairing can be symmetrical or asymmetrical fore and aft of the maximum cross-sectional area, depending on the aircraft and wing configuration. As such, method 700 is similar to designing of other aerodynamic devices such as the wing.

At step 712, a determination is made whether the cupola fairing configuration and its positioning is optimized with respect to the reference wing and root chord and the entire aircraft. Again, optimization is analyzed using CFD and/or wind tunnel techniques in a well-known manner. If the fairing 250 is not optimized, the method 700 proceeds to step 706, where different metrics for the cross-sectional area, cupola positioning and longitudinal profile can be simulated and tested using the CFD and/or wind tunnel techniques, as discussed above.

In another aspect, the cross-sectional area of the cupola fairing 250 may increase transonic shock induced wave drag and pressure drag on the wing in some cases, specifically where the wing 220 has been designed to cruise near its Mach drag divergent point. At optional step 714, this undesirable increase can be mitigated with no or minimal loss of wing lift by re-positioning or re-contouring the components/devices at the trailing edge 226 of the wing 220, such as flaps, control surfaces and/or other fairings. Re-positioning of such trailing edge devices can be accomplished through flap and/or control surface rigging, adjustment of up-travel mechanical stops, and/or many other techniques known to persons of ordinary skill in the art. Re-contouring can also be accomplished with a redesign of the trailing edge devices using kits and/or other redesigned components. Alternatively, instead of repositioning or re-contouring the wing trailing edge devices, a new wing design can be implemented to take advantage of the cupola fairing of the present invention. For example, new wing configurations have been incorporated into older designs on transport aircraft without a cupola fairing, notably the 737NG and 777X passenger aircraft. A person of ordinary skill in the art will appreciate that modifications to the trailing edge 226 of the wing 220 can also be provided in other circumstances, e.g., where an enlarged cupola fairing (e.g., to house additional electronics, instruments, antennas, etc.) is desired and which would not be optimal for increasing lift and decreasing drag if installed on the aircraft. Modifications to the trailing edge of the wing could help improve the L/D ratio in these circumstances.

At step 716, once the overall shape, dimensions and configuration are determined, the cupola fairing 250 can be fabricated for the specific aircraft model with a smooth, curved exterior surface in accordance with by steps 702 through 714. In one embodiment, an internal flange (not shown) is used for attachment to the crown of the fuselage 210. The fairing 250 can also be attached by an external flange (not shown), attachment to internal fairing structure, or a combination of these. Attachment to the fuselage can also be facilitated by blind bolts and blind rivets without structural doublers. The fairing 250 is illustratively reinforced every 24" with 1"×2" "C-shaped" section frames (not shown) or other reinforcement members, although such framing/reinforcement distances are not considered limiting. The fairing 250 can be constructed of molded fiberglass and epoxy for electromagnetic transparency in multiple steps. Alternatively, the fairing can be fabricated from composite materials such as quartz, fiberglass, carbon fiber, Kevlar, Vectran or other aerospace grade reinforcing fibers and plastics. The fairing 250 can also be fabricated from metals such as aluminum, steel, stainless steel, titanium, or other aerospace grade metals, or a combination of composite and metal materials. The process for fabricating the fairing 250 can be by molding, machining, additive manufacturing, or combination of these practices. Once the fabrication process of the cupola fairing 250 is completed, the method 700 ends at step 799, where the cupola fairing 250 can be attached as a kit to older aircraft, or incorporated in to the fuselage a part of a new aircraft design.

Advantageously, the present cupola fairing 250 can be implemented after the aircraft wing and fuselage designs have been frozen or are already in production. For a newly designed aircraft, the fairing and the wing design can be iterative and both can be optimized with regard to the other device.

As noted above, the embodiment as shown in FIGS. 2-5 illustrate a 7% cross-sectional area fairing located at 15% centerline wing root reference chord. By way of comparison, other embodiments set forth herein (see e.g., FIGS. 9-12) represent some practical embodiments on one aircraft model (e.g., BOEING 737). A person of ordinary skill in the art will appreciate that other embodiments of the cupola fairing can be formed and positioned in a similar manner described above for other aircraft models.

Figure 9:
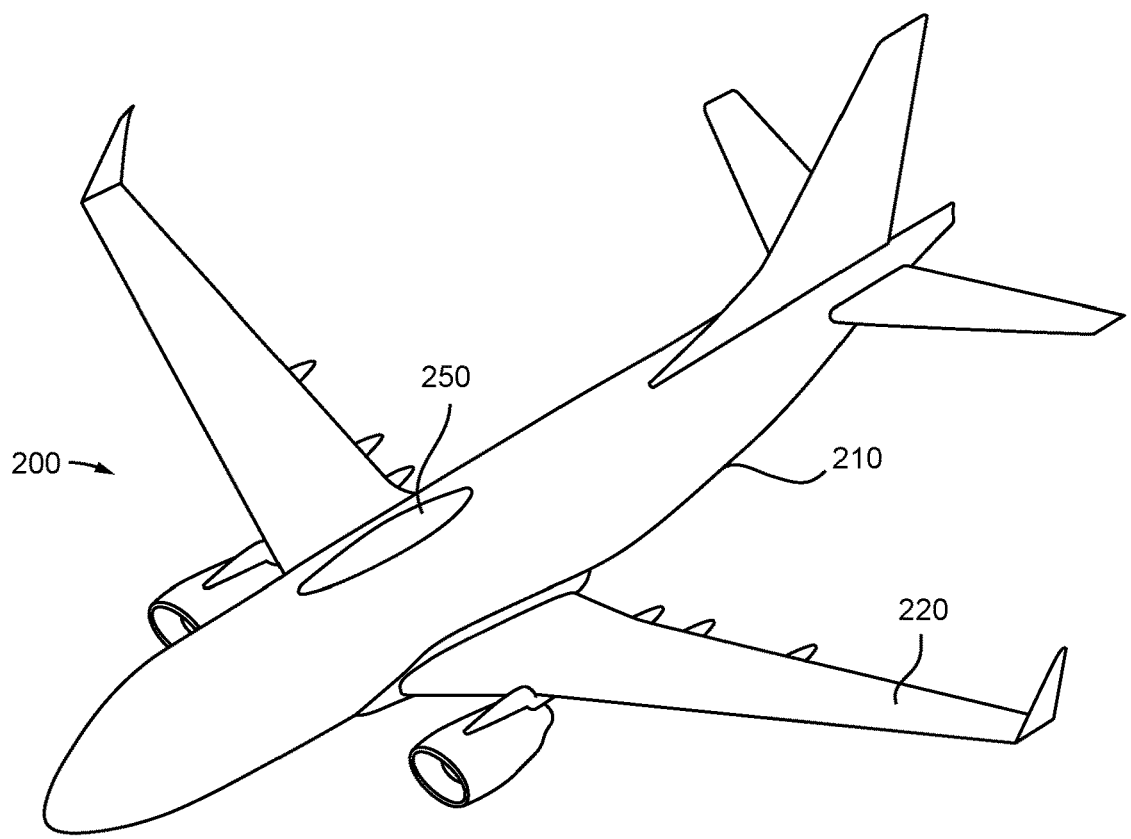
FIG. 9 is a top, front, left side perspective view of the aircraft illustrating a second embodiment of the cupola fairing mounted thereon and having a 7% fuselage cross-sectional area and located at 35% centerline wing root reference chord of the aircraft.
Figure 10:
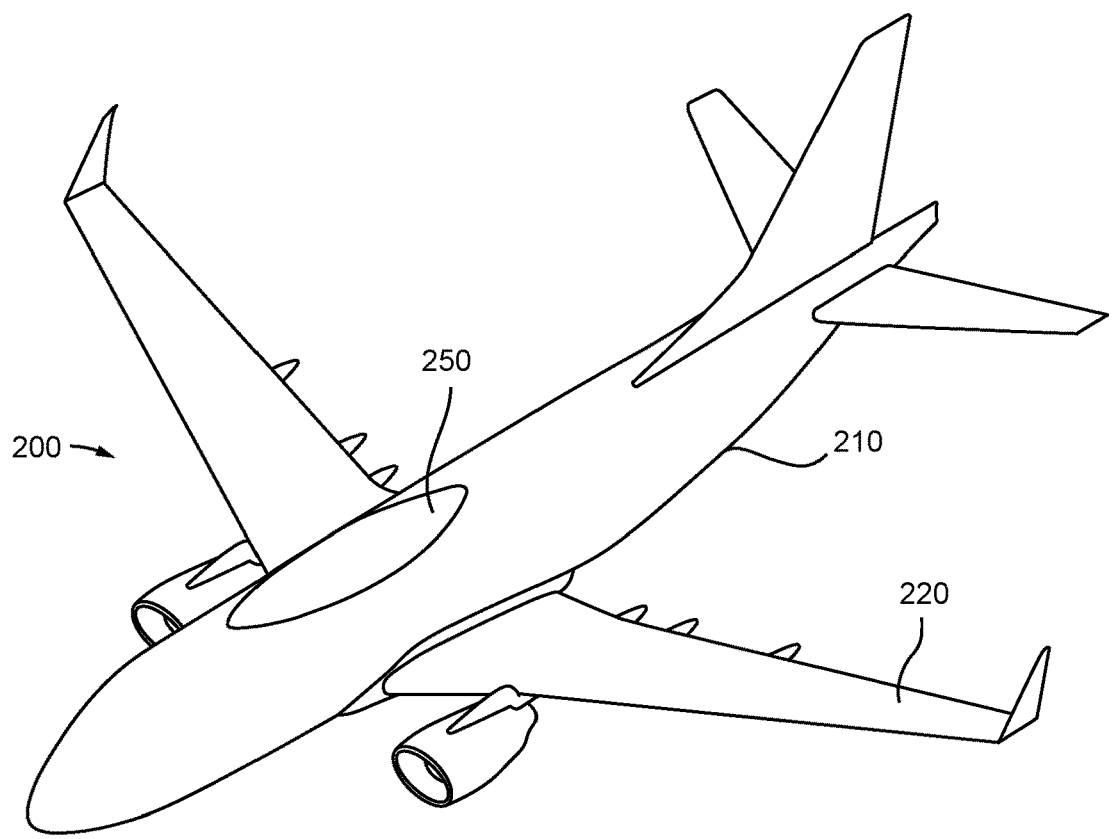
FIG. 10 is a top, front, left side perspective view of the aircraft illustrating a third embodiment of the cupola fairing mounted thereon and having a 12% fuselage cross-sectional area and located at 25% centerline wing root reference chord of the aircraft.
Figure 11:
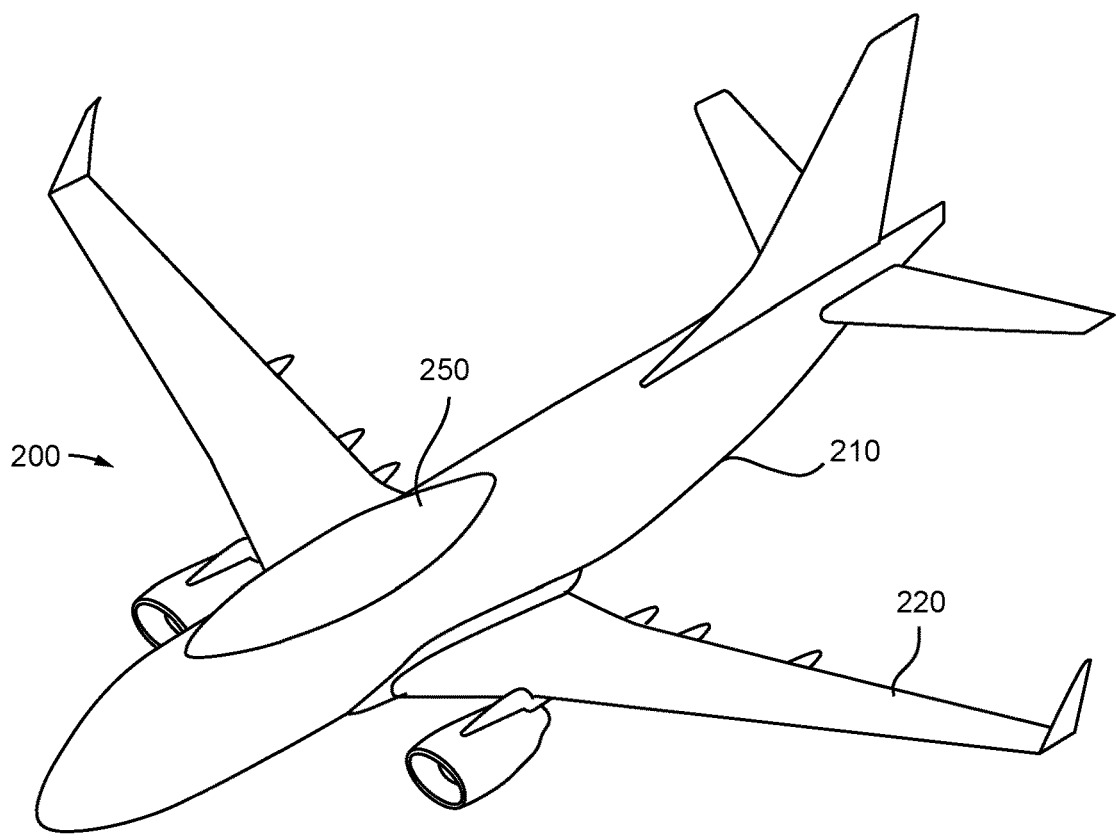
FIG. 11 is a top, front, left side perspective view of the aircraft illustrating another embodiment of the cupola fairing mounted thereon and having a 20% fuselage cross-sectional area and located at 15% centerline wing root reference chord of the aircraft.
Figure 12:
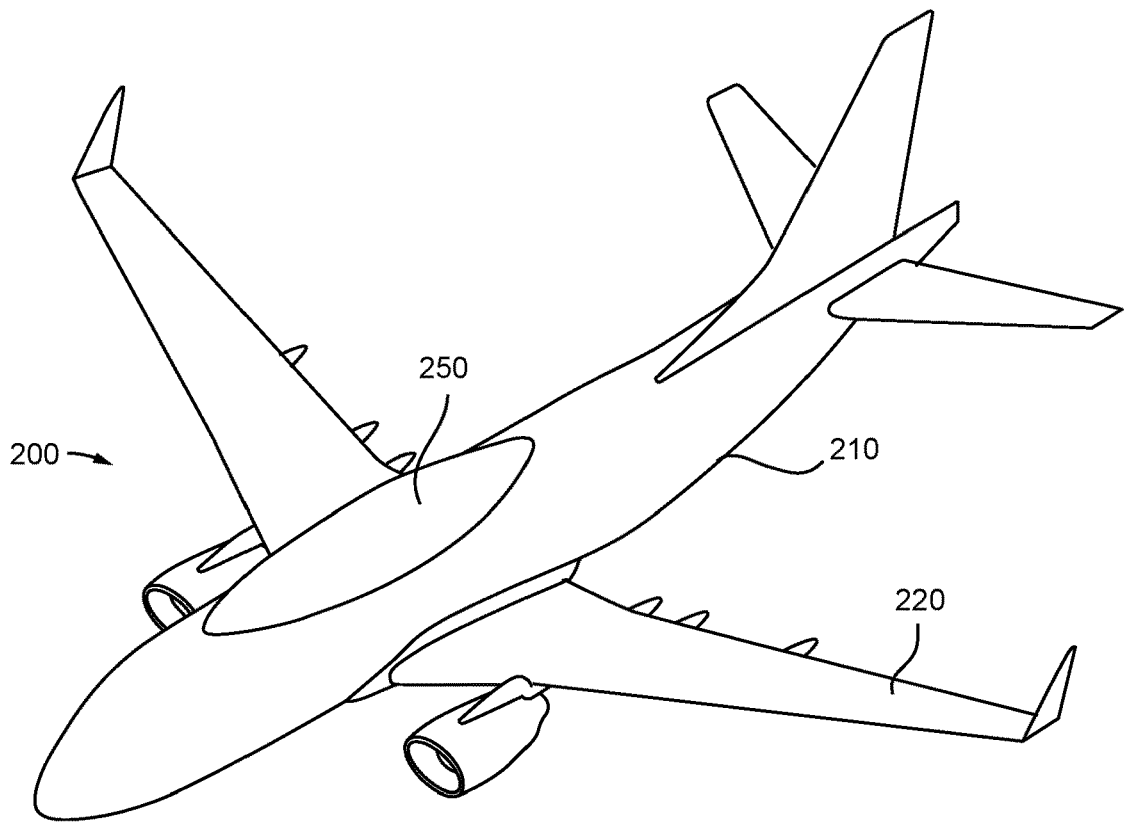
FIG. 12 is a top, front, left side perspective view of the aircraft illustrating yet another embodiment of the cupola fairing mounted thereon and having a 20% fuselage cross-sectional area and located at 35% centerline wing root reference chord of the aircraft.

For example, FIGS. 9-12 depict other configurations and positions of the cupola fairing 250 on the crown portion 212 of the aircraft 200, where FIG. 9 shows a 7% cross-sectional area fairing located at 35% centerline wing root reference chord; FIG. 10 shows a 12% cross-sectional area fairing located at 25% centerline wing root reference chord; FIG. 11 shows a 20% cross-sectional area fairing located at 15% centerline wing root reference chord; and FIG. 12 shows a 20% cross-sectional area fairing located at 35% centerline wing root reference chord. A person of ordinary skill in the art will appreciate that all combinations are tested for lift-to-drag ratio with well-known commercially available computational fluid dynamic programs/wind tunnel techniques for validation by the commercial and military aircraft industry.

In addition to increasing lift over the wingspan and fuselage of the aircraft, additional provisions can be included during the fabrication process of the cupola fairing 250 to help mitigate direct and indirect effects of lightning strikes on the airframe and fairing. The additional provisions can include conductive elements, coatings, bonding straps and/or other devices. In another aspect, the fairing can be located and configured in an area of the fuselage that can shield existing anti-collision lights or other lights. In this embodiment, provision is made for a streamlined anti-collision light located at the maximum height of the fairing. The light has negligible effect on aerodynamics. Additionally the fairing 250 is generally hollow and can house electronic equipment, sensors and communications antennas in a well-known manner. Further, all or part of the cupola fairing surface can be configured and/or used to mount conformal sensors or antenna. A person of ordinary skill in the art will appreciate that conformal sensors and antenna mounted flush to the outer mold line of the fairing do not require electromagnetic transparency and allow the fairing to be made of any of the materials discussed above.

Figure 13A:
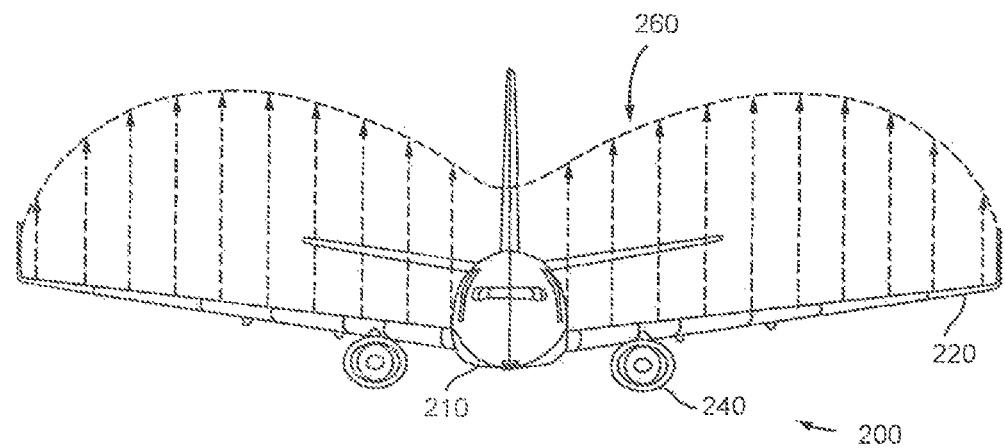
FIGS. 13A (prior art) and 13B are front elevational views of an aircraft without and with the cupola fairing of the present invention, respectively, and comparatively illustrating lift magnitude being exhibited across the wings span and fuselage of the aircraft with and without the cupola fairing.
Figure 13B:
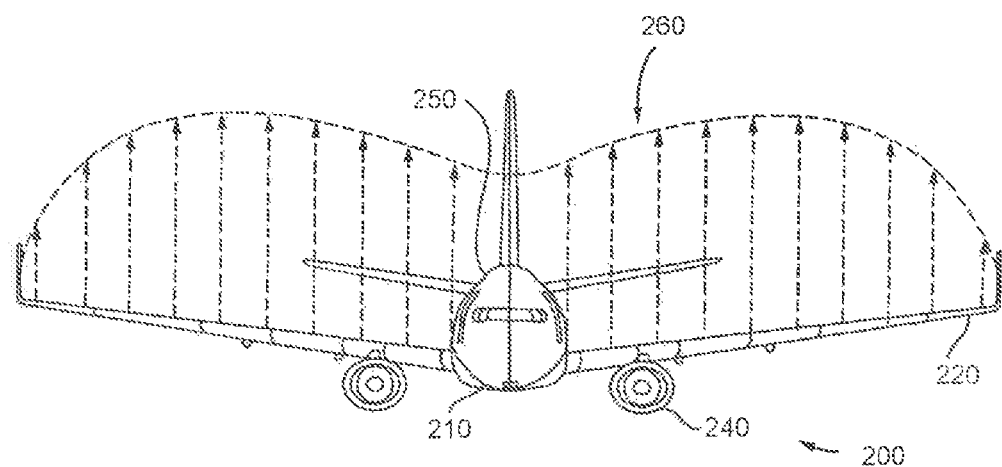

The cupola fairing 250 of the present invention and its positioning on an aircraft via the method discussed herein has numerous advantages over prior art aircraft including the unexpected increase in lift on the fuselage in the area of the reference wing chord. The increase in lift from the cupola fairing also helps improve the span wise lift distribution, as illustratively shown in FIGS. 13A and 13B. Referring to FIG. 13A, the upper figure of a prior art aircraft without the cupola fairing is shown. The upwardly directed vertical lines 260 illustrate the magnitude and direction of the lift occurring over the wing span and fuselage of the aircraft. A notable characteristic is the reduced lift effect that occurs over the fuselage 210 between the wings 220. Referring to FIG. 13B, an aircraft 200 having a cupola fairing 250 of the present invention is illustratively shown with the magnitude of lift again illustrated by the vertical lines 260. Advantageously, there is an increased magnitude in lift occurring over the fuselage 210 with the cupola present. In addition, the increased lift over the fuselage as a result of the presence of the cupola fairing 250 also helps reduce wing bending loads, thereby reducing stress on the wing structures.

Figure 14:
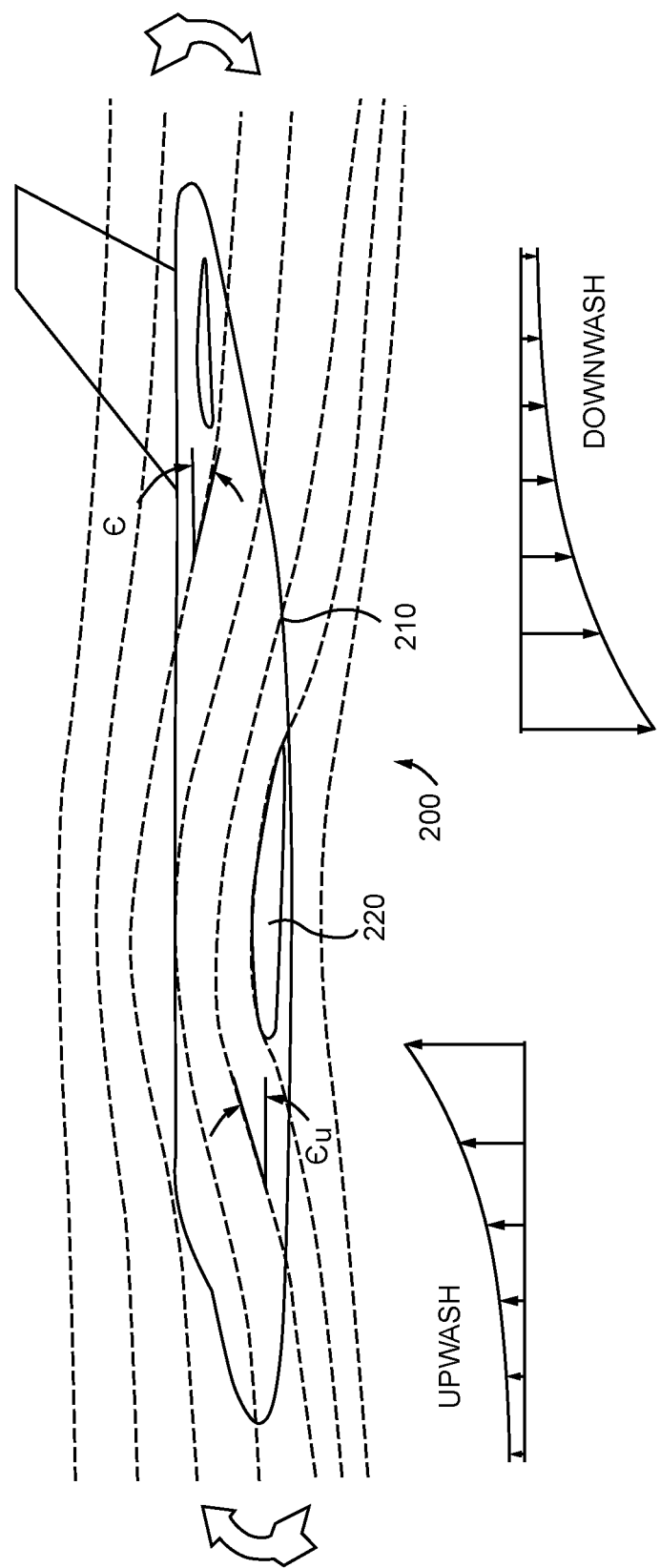
FIG. 14 is a prior art side elevational view an aircraft illustrating air flow around the fuselage and wings of an aircraft without the cupola fairing of the present invention.

Referring to FIG. 14, a prior art schematic diagram illustrating air flow over an aircraft without the cupola fairing of the present invention present and how the wing and horizontal stabilizers influence flow on the fuselage is illustratively shown. Notably, a rise in air flow occurs over the wings and fuselage, as indicated by a curved "hump" located above fuselage between the wings.

FIGS. 15A-18B are representations of various views of screen shots of computer simulated aircraft to illustrate comparative effects on airflow with and without the cupola fairing of the present invention mounted on the aircraft. FIGS. 15A, 16A, 17A and 18A are various views of a prior art aircraft without the cupola fairing of the present invention. FIGS. 15B, 16B, 17B and 18B are various views of an aircraft with the cupola fairing of the present invention mounted on the crown portion of the fuselage. The drawings were taken from color-coded computer simulations which were configured and performed by the inventors using the well-known NASA "Common Resource Model" (CRM) from the 5th AIAA Drag Prediction Workshop, although such simulation program is not considered limiting. The simulations conducted were from an industry standard model of a 767/777/A330/A350 class aircraft. The CRM is used throughout the industry in wind tunnel and computational fluid dynamics (CFD) work to develop an understanding of drag and how to predict it. The figures illustrate air flow over unmodified model aircraft without the cupola fairing and the modified models with the cupola fairing mounted on the crown of the fuselage between the wings. In interpreting these images, undesirable flow causing drag is bent or recirculated (reversed), while lower drag flow bends and recirculates less. High surface pressure areas (HP) are illustrated by a high concentration of broken lines, as compared to low surface pressure (LP) areas which are illustrated by a lesser amount of broken lines at specific areas of the aircraft. Abrupt pressure changes are shown as abrupt changes in spacing and density of the broken lines, such as at the wing roots of the wings and stabilizers. Less abrupt changes indicate lower drag. Changes in flow direction from the horizontal wing surface to the vertical surface of the fuselage at or around the wing root are significant contributions to drag, where more parallel flow to the wing root will result in lower drag. In FIGS. 15A-18B, the arrows labeled "LA" represent undesirable large angles of air flow that appear near the wing root chord and wing root fairing as shown in the prior art drawings of FIGS. 15A, 16A, 17A and 18A. By contrast, the cupola fairing 250 of the present invention causes the air flow to dampen or flatten around the wing root chords, and the arrows labeled "SA" represent smaller angles at which the air flows towards and away from the wing root and wing root fairing. The arrows labeled "HP" and "LP" respectively denote undesirable high pressure aircraft locations and more desirable low pressure areas once the cupola fairing is present.

Figure 15A:
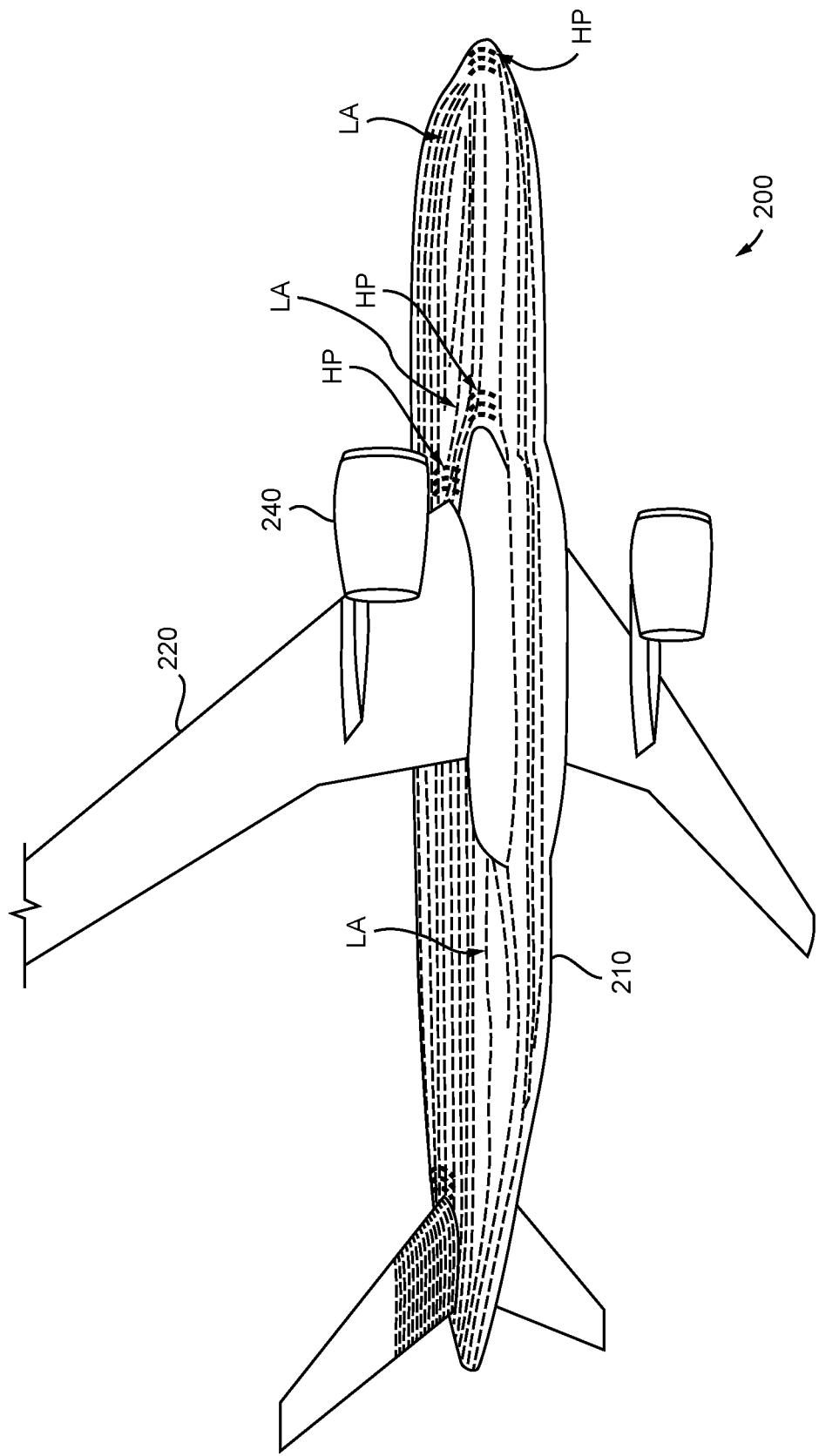
FIGS. 15A (prior art) and 15B are lower right side perspective views of an aircraft, respectively without and with the cupola fairing of the present invention, and comparatively illustrating air flow around the fuselage and wings of the aircraft without and with the cupola fairing of the present invention.
Figure 15B:
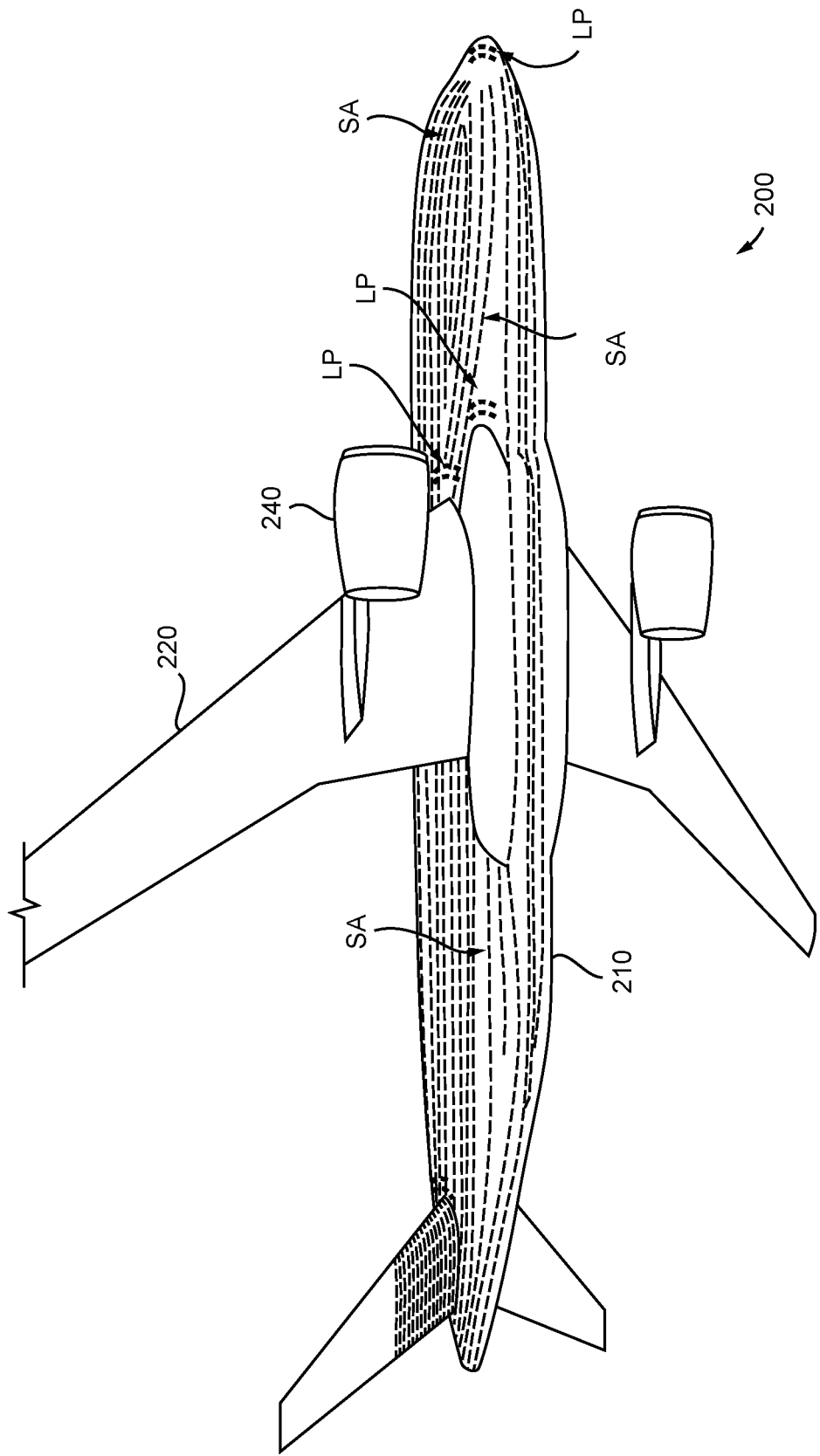

Referring to FIGS. 15A (prior art) and 15B, FIG. 15A illustrates the lower portion of the aircraft 200 without the cupola fairing and rotated forty-five degrees, while FIG. 15B illustrates the lower portion of the aircraft 200 with the cupola fairing 250 mounted thereon. Comparing the computer simulation of the airflow shown in FIG. 15B to FIG. 15A, there is less turning flow and reduced air flow distortion over the wing and portion of fuselage between the wings. This can be seen by the reduced air flow at the leading and trailing edge wing roots in computer simulation of FIG. 15B.

Figure 16A:
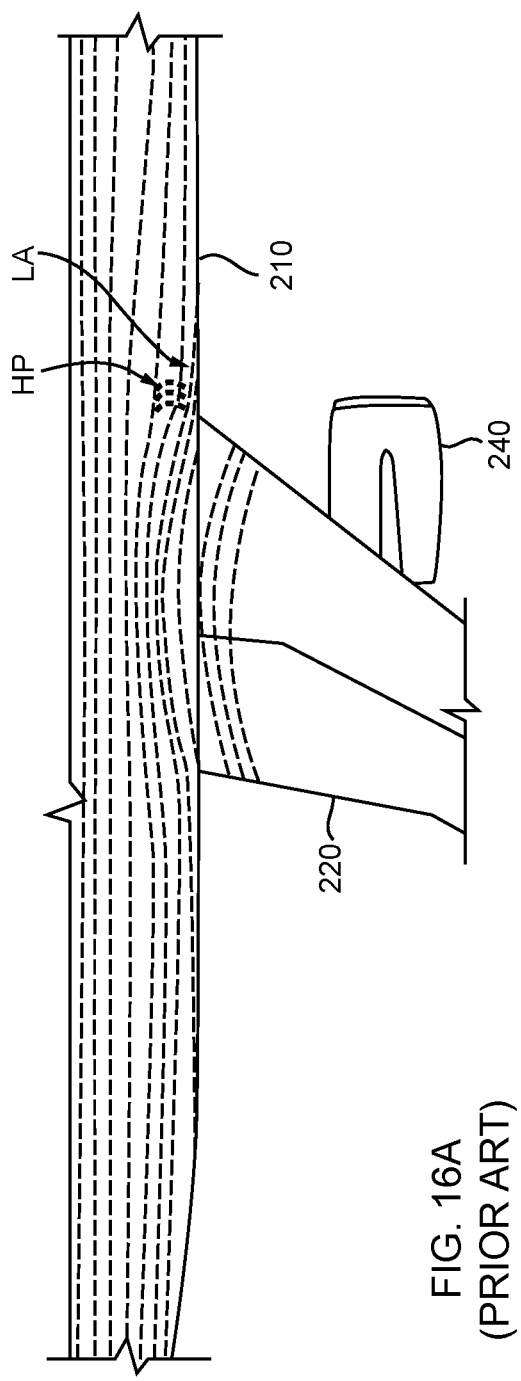
FIGS. 16A (prior art) and 16B are top views of the aircraft of FIGS. 15A and 15B comparatively illustrating air flow around the fuselage and wings of an aircraft without and with the cupola fairing of the present invention.
Figure 16B:
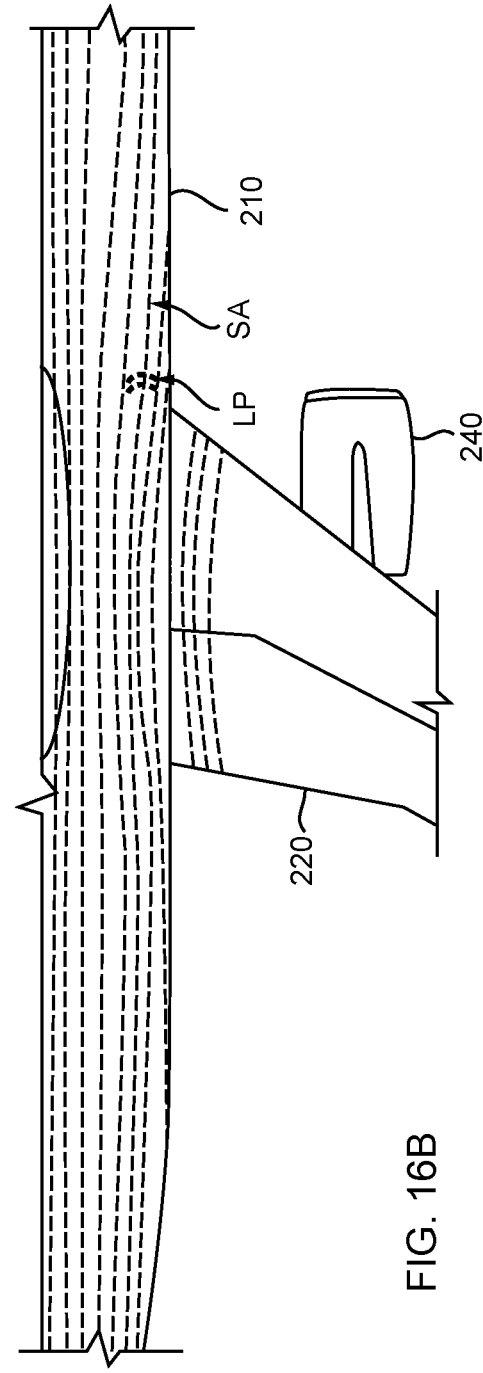

Referring to FIGS. 16A (prior art) and 16B, a comparison of the airflow over the fuselage and wing root is shown on the aircraft respectively without and with the cupola fairing. FIG. 16A shows the curved flow around the wing root, while FIG. 16B shows straightened flow around wing root. In these enlarged top plan views of the aircraft, there is a notable reduction in airflow distortion at the trailing edge wing root and turning at the forebody of the fuselage in FIG. 16B, as compared to the air flow simulation illustrated in FIG. 16A.

Figure 17A:
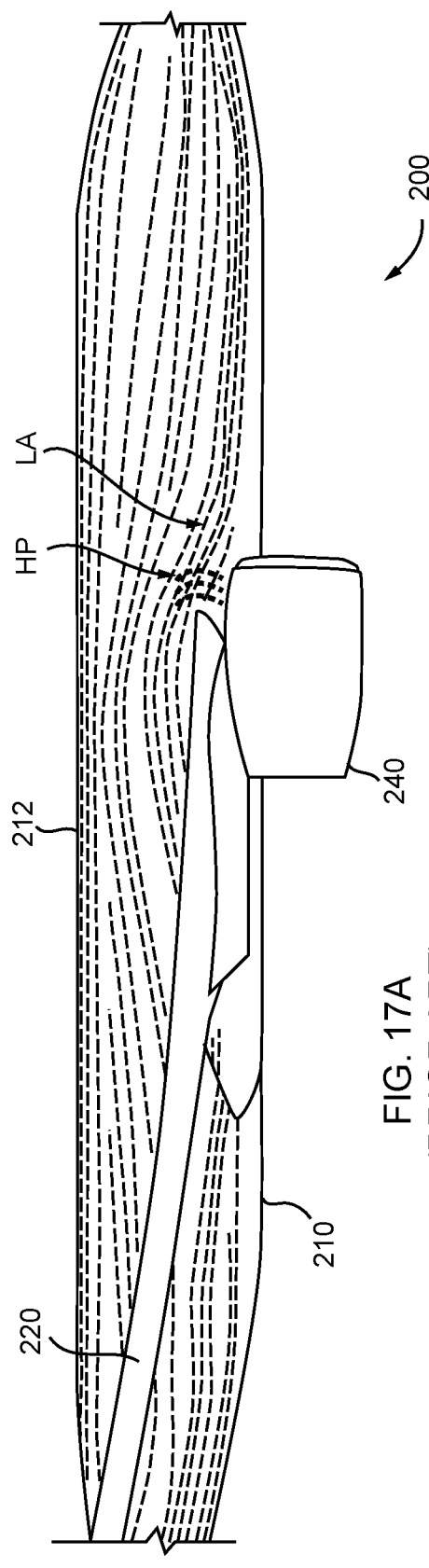
FIGS. 17A (prior art) and 17B are right side elevational views the aircraft of FIGS. 15A and 15B illustrating air flow around the fuselage and wings of an aircraft without and with the cupola fairing of the present invention.
Figure 17B:
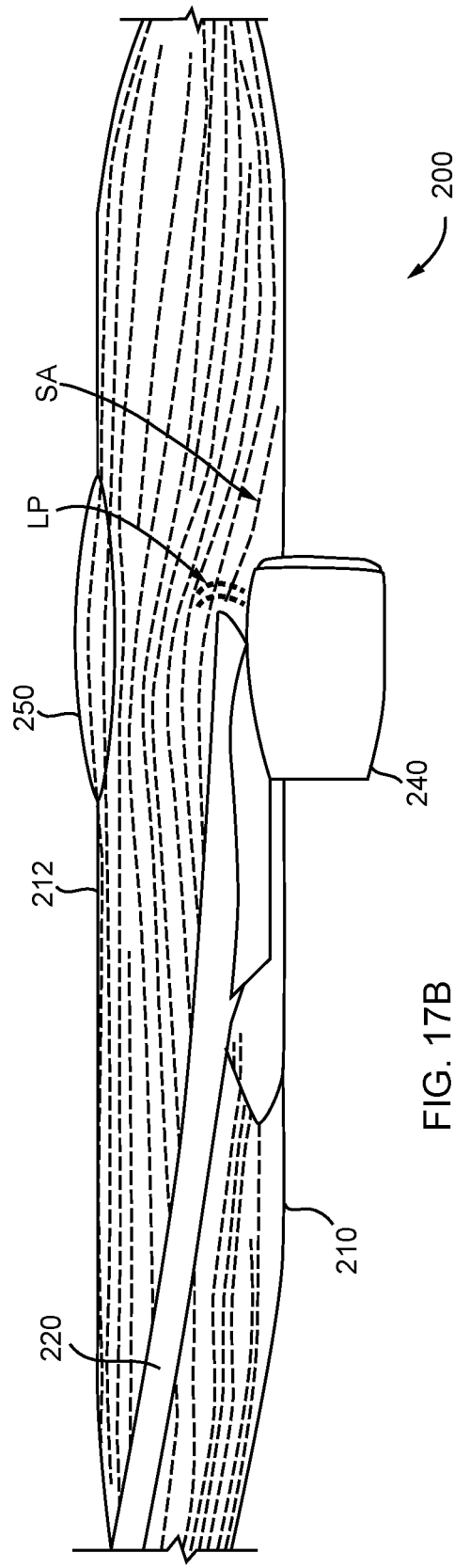

Referring to FIGS. 17A (prior art) and 17B, a comparison of the airflow over the fuselage and wing root is shown on the aircraft respectively without and with the cupola fairing. In these right side views of the aircraft, there is a notable reduction in airflow distortion at the trailing edge wing root and turning at the forebody of the fuselage in FIG. 17B, as compared to the air flow simulation illustrated in FIG. 17A. FIG. 17B shows the fairing cupola 250 causes reduced turning flow and reduction of abrupt pressure gradients at the leading edge of the wing root at the arrow "LP" and decrease flow angle at the arrow "SA".

Figure 18A:
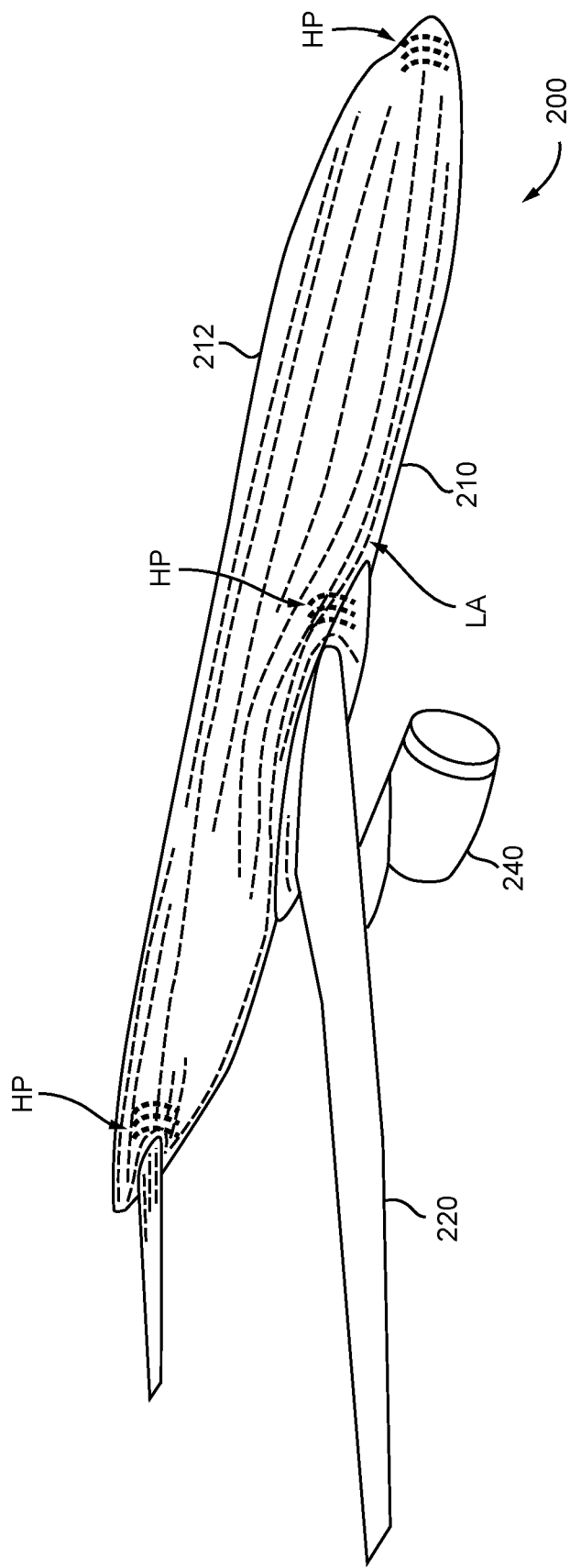
FIGS. 18A (prior art) and 18B are top right side perspective views of the aircraft of FIGS. 15A and 15B illustrating air flow around the fuselage and wings of an aircraft without and with the cupola fairing of the present invention.
Figure 18B:
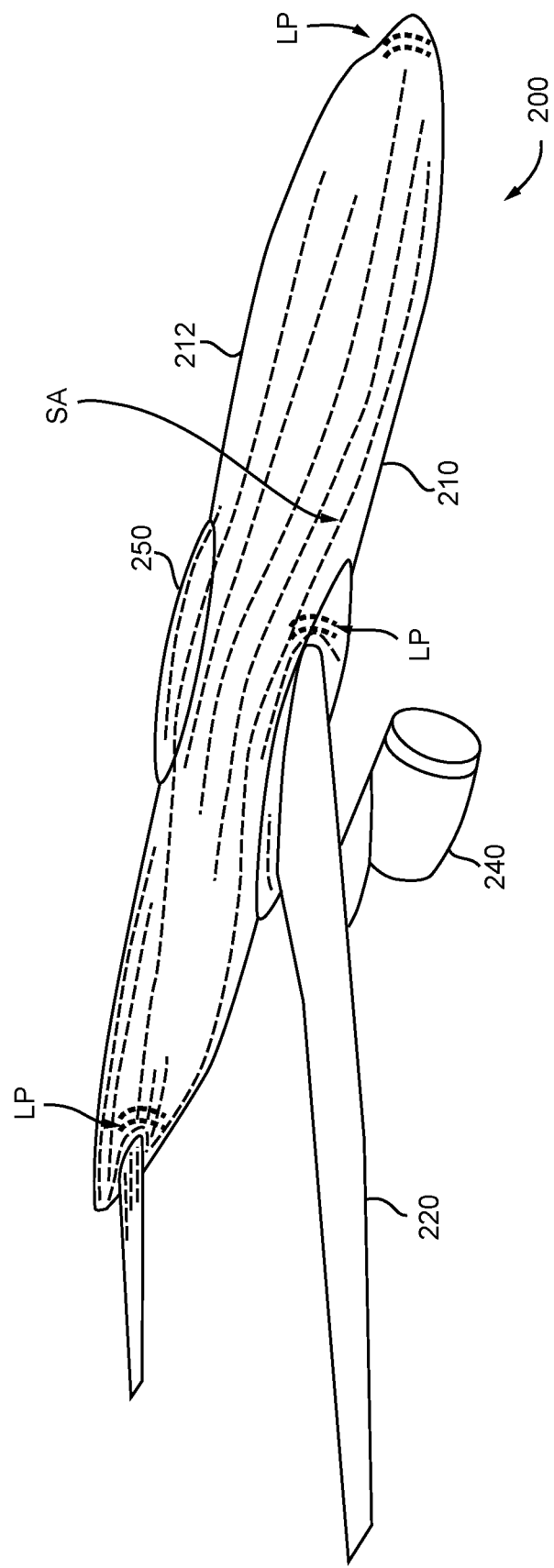

Referring to FIGS. 18A (prior art) and 18B, top, front, right side perspective views of the aircraft are illustratively shown. In FIG. 18A, the aircraft does not include the cupola fairing of the present invention and the computer simulation reveals a lack of lift over the fuselage. In FIG. 18B, the aircraft 200 includes the cupola fairing 250 and illustrates lift on the fuselage with minimal impact on wing pressure and reduced wing leading edge stagnation at the wing-fuselage intersection, as compared to the minimal lift simulation illustrated in FIG. 18A.

Besides the clearly shown advantages in lift over the wing span and corresponding fuselage portion, other advantages can include a reduction of turning shock flow on the forebody of the fuselage; increased induced alpha of flow on the forebody of the fuselage leading to reduced stagnation drag on the nose and windscreen; reduction of wing leading edge to fuselage stagnation drag; reduction of inboard wing stagnation line upsweep (this effect is beneficial to lift, and lift to drag ratio); increase in fuselage lift coefficient without detrimental effect on wing lift coefficient and without increase in wave drag; reduction of inboard wing trailing edge separation at combinations of high lift coefficient and transonic Mach number; importantly, reduction of fuselage to wing flow exchange on the upper and lower surfaces of the wing leading to reduction of rotational flow and drag;

reduction of aft fuselage turning shock where the fuselage transitions from straight to tapered; reduction of aft fuselage separation in the area of the horizontal stabilizer; reduction of horizontal stabilizer root stagnation drag; reduction of fuselage to horizontal stabilizer flow exchange on the upper and lower surfaces of the wing leading to reduction of rotational flow and drag; reduction in wave and separation drag on the horizontal stabilizer; reduction of aft fuselage separation aft of the vertical and horizontal stabilizers, among other benefits which can result in significant cost savings in fuel, maintenance and longevity of the aircraft structure.

A further advantage can include accommodating communications antennas such as broadband data or other electromagnetic and/or optical sensors where an aerodynamic benefit is achieved by the cupola fairing, instead of creating additional drag if the cupola were not present. Yet another advantage of the cupola fairing being mounted over the crown of the fuselage and positioned between the wings is where the structure of the fairing is sufficient to not require additional secondary structure be added to the airframe, such as structural doublers or fittings. Moreover, a person of ordinary skill in the art will appreciate that a "area ruling" is a technique to reduce fuselage cross-sectional area in the long axis of the aircraft in the vicinity of the wing and/or to increase it ahead of and aft of the wing. The cupola fairing 250 of the present invention reveals the opposite of the current industry trend to thereby better reduce drag and improve lift over the wingspan and fuselage area between the wings, as discussed herein.

While the foregoing is directed to embodiments of the present invention, other and further embodiments and advantages of the invention can be envisioned by those of ordinary skill in the art based on this description without departing from the basic scope of the invention, which is to be determined by the claims that follow.

What is claimed is:

1. A cupola fairing for positioning on a crown portion of a fuselage of an aircraft and configured to increase lift of the fuselage relative to a fuselage without the cupola fairing, the cupola fairing comprising:
    a housing having a length extending along a longitudinal axis, and a variable width extending normal to the longitudinal axis, the width being defined by a plurality of cross-sectional areas of the cupola fairing, the cupola fairing having a substantially smooth exterior surface that is curved along the length and the width of the housing;
    wherein the housing has a lower surface configured to conform to a shape of the crown portion at a fuselage position where a maximum cross-sectional area of the plurality of cross-sectional areas is between −35% and +25% of a reference wing root chord of the aircraft.

2. The cupola fairing of claim 1, wherein the lower surface is configured so that the longitudinal axis is aligned with a centerline of the fuselage.

3. The cupola fairing of claim 1, wherein the housing is symmetrical about the longitudinal axis.

4. The cupola fairing of claim 1, wherein the housing is substantially elliptical in shape.

5. The cupola fairing of claim 1, wherein the housing is fabricated from at least one of a composite material and a metal.

6. The cupola fairing of claim 1, wherein the exterior surface is convex-shaped.

7. The cupola fairing of claim 1, wherein the housing includes a hollow interior portion.

8. The cupola fairing of claim 7, wherein the interior portion includes a plurality of spaced-apart support members configured to reinforce the housing.

9. The cupola fairing of claim 1, wherein the maximum cross-sectional area is in a range of between 5% and 25% of a fuselage cross-sectional area at which a centerline of the fuselage and a leading edge of the wing intersect.

10. A cupola fairing for positioning on a crown portion of a fuselage of an aircraft and configured to increase lift of the fuselage relative to a fuselage without the cupola fairing, the cupola fairing comprising:
    a housing having a length extending along a longitudinal axis, and a variable width extending normal to the longitudinal axis, the width being defined by a plurality of cross-sectional areas of the cupola fairing, the cupola fairing having a substantially smooth exterior surface that is curved along the length and the width of the housing;
    wherein the housing has a lower surface configured to conform to a shape of the crown portion at a fuselage position where a maximum cross-sectional area of the plurality of cross-sectional areas is between +15% and +35% of a reference wing root chord of the aircraft.

11. The cupola fairing of claim 10, wherein the lower surface is configured so that the longitudinal axis is aligned with a centerline of the fuselage.

12. The cupola fairing of claim 10, wherein the housing is symmetrical about the longitudinal axis.

13. The cupola fairing of claim 10, wherein the housing is substantially elliptical in shape.

14. The cupola fairing of claim 10, wherein the housing is fabricated from at least one of a composite material and a metal.

15. The cupola fairing of claim 10, wherein the exterior surface is convex-shaped.

16. The cupola fairing of claim 10, wherein the housing includes a hollow interior portion.

17. The cupola fairing of claim 16, wherein the interior portion includes a plurality of spaced-apart support members configured to reinforce the housing.

18. The cupola fairing of claim 10, wherein the maximum cross-sectional area is in a range of between 5% and 25% of a fuselage cross-sectional area at which a centerline of the fuselage and a leading edge of the wing intersect.

19. A cupola fairing for positioning on a crown portion of a fuselage of an aircraft and configured to increase lift of the fuselage relative to a fuselage without the cupola fairing, the cupola fairing comprising:
    a housing having a length extending along a longitudinal axis, and a variable width extending normal to the longitudinal axis, the width being defined by a plurality of cross-sectional areas of the cupola fairing, the cupola fairing having a substantially smooth exterior surface that is curved along the length and the width of the housing;
    wherein the housing has a lower surface configured to conform to a shape of the crown portion at a fuselage position where a maximum cross-sectional area of the plurality of cross-sectional areas is between 0% and +35% of a reference wing root chord of the aircraft.

20. The cupola fairing of claim 19, wherein the lower surface of the housing is configured to conform to the shape of the crown portion at a fuselage position where the maximum cross-sectional area of the plurality of cross-sectional areas is between 0% and +25% of the reference wing root chord of the aircraft.

* * * * *